US011283601B2

(12) United States Patent
Haga et al.

(10) Patent No.: US 11,283,601 B2
(45) Date of Patent: *Mar. 22, 2022

(54) UPDATE MANAGEMENT METHOD, UPDATE MANAGEMENT SYSTEM, AND NON-TRANSITORY RECORDING MEDIUM

(71) Applicant: PANASONIC INTELLECTUAL PROPERTY CORPORATION OF AMERICA, Torrance, CA (US)

(72) Inventors: Tomoyuki Haga, Nara (JP); Hideki Matsushima, Tokyo (JP); Manabu Maeda, Osaka (JP); Yuji Unagami, Osaka (JP); Jun Anzai, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/820,428

(22) Filed: Mar. 16, 2020

(65) Prior Publication Data

US 2020/0220716 A1 Jul. 9, 2020

Related U.S. Application Data

(63) Continuation of application No. 15/416,061, filed on Jan. 26, 2017, now Pat. No. 10,637,657, which is a (Continued)

(30) Foreign Application Priority Data

Sep. 24, 2015 (JP) .................................. 2015-187536

(51) Int. Cl.
*H04L 29/06* (2006.01)
*H04L 9/08* (2006.01)
(Continued)

(52) U.S. Cl.
CPC ............ *H04L 9/085* (2013.01); *B60R 16/023* (2013.01); *G06F 8/65* (2013.01); *G06F 8/654* (2018.02);
(Continued)

(58) Field of Classification Search
CPC ..... H04L 9/085; H04L 63/062; H04L 63/068; H04L 67/12; B60R 25/24; B60R 16/023;
(Continued)

(56) References Cited

U.S. PATENT DOCUMENTS 9,231,936 B1   1/2016 Wang et al.
2001/0002814 A1   6/2001 Suganuma et al.
(Continued)

FOREIGN PATENT DOCUMENTS

JP  2001-225706 A  8/2001
JP  2002-144983 A  5/2002
(Continued)

OTHER PUBLICATIONS

International Search Report, dated Dec. 15, 2015, for International Application No. PCT/JP2015/005165.

*Primary Examiner* — Taghi T Arani
*Assistant Examiner* — Lin Chang
(74) *Attorney, Agent, or Firm* — Greenblum & Bernstein, P.L.C.

(57) ABSTRACT

An update management method is used in an onboard network system having a plurality of electronic control units (ECUs) that performs communication via a network and connects to an external tool. The method includes a master ECU storing a shared key and an expiration date of the shared key. When the master ECU receives an update message, verifying update authority information indicating authority of the external tool, and determining whether or not a transmission of the update message is within a range
(Continued)

of an authority of the external tool. The method also includes acquiring external point-in-time information, determining whether or not the external point-in-time information is before the expiration date, and transmitting an alert message prompting an update of the shared key. The ECUs are prioritized according to a designated level of authority, including chassis-related functions, body-related functions, safety/comfort functions, and telematics/infotainment functions.

13 Claims, 20 Drawing Sheets

Related U.S. Application Data continuation of application No. PCT/JP2015/005165, filed on Oct. 13, 2015.

(60) Provisional application No. 62/078,476, filed on Nov. 12, 2014.

(51) Int. Cl.
| | | |
|---|---|---|
| *G06F 8/654* | (2018.01) | |
| *G06F 21/62* | (2013.01) | |
| *G06F 21/57* | (2013.01) | |
| *G06F 21/44* | (2013.01) | |
| *B60R 16/023* | (2006.01) | |
| *G06F 8/65* | (2018.01) | |
| *H04L 67/12* | (2022.01) | |

(52) U.S. Cl.
CPC .......... *G06F 21/445* (2013.01); *G06F 21/572* (2013.01); *G06F 21/6218* (2013.01); *H04L 63/062* (2013.01); *H04L 63/068* (2013.01); *G06F 2221/2107* (2013.01); *G06F 2221/2113* (2013.01); *G06F 2221/2137* (2013.01); *G06F 2221/2141* (2013.01); *G06F 2221/2151* (2013.01); *H04L 67/12* (2013.01)

(58) Field of Classification Search
CPC ..... B60R 25/241; B60R 25/248; G06F 21/44; G06F 8/65; G06F 21/00; G06F 21/445; G06F 21/604; G06F 2221/2151; G06F 8/654; G06F 21/572; G06F 21/6218; G06F 2221/2107; G06F 2221/2113; G06F 2221/2137; G06F 2221/2141
See application file for complete search history.

(56) References Cited

U.S. PATENT DOCUMENTS

| | | | |
|---|---|---|---|
| 2001/0031075 A1* | 10/2001 | Fujii | G06K 9/00006 |
| | | | 382/125 |
| 2004/0002793 A1 | 1/2004 | Tachibana et al. | |
| 2004/0185842 A1 | 9/2004 | Spaur et al. | |
| 2008/0072068 A1* | 3/2008 | Wang | G06F 21/572 |
| | | | 713/191 |
| 2008/0235515 A1* | 9/2008 | Yedidia | G06K 9/00073 |
| | | | 713/186 |
| 2009/0254750 A1 | 10/2009 | Bono et al. | |
| 2009/0271634 A1* | 10/2009 | Boult | H04L 9/0866 |
| | | | 713/186 |
| 2011/0083161 A1 | 4/2011 | Ishida et al. | |
| 2011/0095765 A1 | 4/2011 | Tae et al. | |
| 2011/0126024 A1* | 5/2011 | Beatson | G06F 21/32 |
| | | | 713/186 |
| 2011/0302420 A1* | 12/2011 | Davida | G06F 21/32 |
| | | | 713/180 |
| 2011/0320089 A1 | 12/2011 | Lewis | |
| 2012/0124571 A1 | 5/2012 | Nagai et al. | |
| 2012/0195475 A1* | 8/2012 | Abiko | G06T 7/00 |
| | | | 382/115 |
| 2013/0173112 A1 | 7/2013 | Takahashi et al. | |
| 2014/0105403 A1* | 4/2014 | Baldi | H04L 9/0861 |
| | | | 380/282 |
| 2014/0372766 A1* | 12/2014 | Ryan, Jr. | G06F 21/32 |
| | | | 713/178 |
| 2015/0089236 A1 | 3/2015 | Han et al. | |
| 2015/0172298 A1 | 6/2015 | Otsuka | |
| 2015/0180840 A1 | 6/2015 | Jung et al. | |
| 2015/0277890 A1 | 10/2015 | Throop et al. | |
| 2015/0358329 A1* | 12/2015 | Noda | G06F 21/57 |
| | | | 726/4 |
| 2016/0034585 A1* | 2/2016 | Rokhlenko | G06Q 30/02 |
| | | | 707/728 |
| 2016/0035147 A1 | 2/2016 | Huang | |

FOREIGN PATENT DOCUMENTS

| | | |
|---|---|---|
| JP | 2004-028000 A | 1/2004 |
| JP | 2010-257145 A | 11/2010 |
| JP | 2011-081604 A | 4/2011 |
| JP | 2012-103181 A | 5/2012 |
| JP | 2012-188027 A | 10/2012 |
| JP | 2012-226451 A | 11/2012 |
| JP | 2013-048374 A | 3/2013 |
| JP | 2013-137729 A | 7/2013 |
| JP | 2013-141948 A | 7/2013 |
| JP | 2014-168219 A | 9/2014 |
| WO | 2009/147734 A1 | 12/2009 |

\* cited by examiner

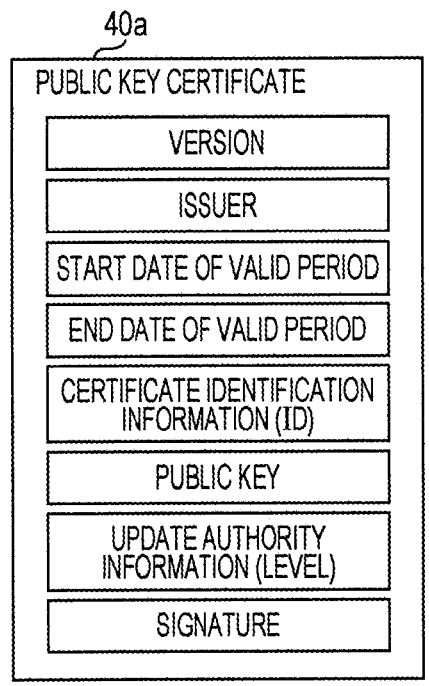

FIG. 14

| MESSAGE ID | LEVEL | REMAINING-CHARGE CONDITIONS | VEHICLE STATE CONDITIONS |
|---|---|---|---|
| 0×104 | 1 | CHARGED 50% OR MORE | STOPPED STATE |
| 0×103 | 2 | CHARGED 50% OR MORE | STOPPED STATE |
| 0×102 | 3 | CHARGED 80% OR MORE | STOPPED STATE |
| 0×100, 0×101 | 4 | CHARGED 80% OR MORE | STOPPED STATE |
| 0×206 | 1 | CHARGED 80% OR MORE | ENGINE OFF |
| 0×204, 0×205 | 2 | CHARGED 80% OR MORE | ENGINE OFF |
| 0×202, 0×203 | 3 | CHARGED 80% OR MORE | ENGINE OFF |
| 0×200, 0×201 | 4 | CHARGED 80% OR MORE | ENGINE OFF |

| SHARED KEY IDENTIFICATION INFORMATION 3310 | EXPIRATION DATE 3311 | ALERT NOTIFICATION TIMING 3312 |
|---|---|---|
| SHARED KEY 60a | 0:00 DECEMBER 1, 2020 | 3 MONTHS PRIOR TO EXPIRATION |
| SHARED KEY 60b | 0:00 DECEMBER 1, 2018 | 1 MONTH PRIOR TO EXPIRATION |
| SHARED KEY 60c | 0:00 DECEMBER 1, 2018 | 1 MONTH PRIOR TO EXPIRATION |
| SHARED KEY 60d | 0:00 DECEMBER 1, 2018 | 1 MONTH PRIOR TO EXPIRATION |
| SHARED KEY 60e | 0:00 DECEMBER 1, 2018 | 1 MONTH PRIOR TO EXPIRATION |

FIG. 22

| 4000 | 4001 | 4002 | 4003 | 4004 | 4005 |
|---|---|---|---|---|---|
| VEHICLE IDENTIFICATION INFORMATION | TOOL ID | MESSAGE ID | DATE AND TIME | UPDATE RESULTS |
| VEHICLE A | 0×A | 0×102 | 10:00 NOVEMBER 11, 2014 | OK |
| VEHICLE B | 0×B | 0×104 | 10:01 NOVEMBER 11, 2014 | NOT OK |

UPDATE MANAGEMENT METHOD, UPDATE MANAGEMENT SYSTEM, AND NON-TRANSITORY RECORDING MEDIUM

CROSS REFERENCE TO RELATED APPLICATION

This application is a continuation of U.S. application Ser. No. 15/416,061, filed Jan. 26, 2017, which is a continuation of International Appl. No. PCT/JP2015/005165, filed Oct. 13, 2015, which claims the benefit of U.S. Prov. Appl. No. 62/078,476, filed Nov. 12, 2014, and priority from Japanese Appl. No. 2015-187536, filed Sep. 24, 2015. The disclosure of each of the above-mentioned documents, including the specification, drawings, and claims, is incorporated herein by reference in its entirety.

BACKGROUND

1. Technical Field

The present disclosure relates to an update management method, an update management system, and a non-transitory recording medium having a computer program stored thereon, for updating data stored in an electronic control unit in an onboard network system.

2. Description of the Related Art

In recent years, a great number of devices called electronic control units (ECU) have been placed in systems in automobiles. A network connecting these ECUs is referred to as an onboard network. Many standards exist for onboard networks. The most mainstream of these is a standard called Controller Area Network (CAN), that is stipulated in ISO11898-1. A CAN is configured using two busses, and each ECU connected to the buses is called a node. Each node connected to a bus transmits/receives messages called frames. No identifiers indicating the transmission destination or transmission source exist in CAN, with the transmitting node attaching an ID (called a message ID) to each frame and transmitting (i.e., sending out signals to the bus), and the receiving nodes only receiving frames of a predetermined message ID (i.e., reading signals from the bus). The Carrier Sense Multiple Access/Collision Avoidance (CSMA/CA) format is also employed, so when multiple nodes transmit at the same time, arbitration by message ID is performed, with frames having a smaller message ID value being transmitted with higher priority. There also exists a port (hereinafter referred to as "diagnostic port") that is an interface communicating with an external tool (e.g., an external device such as a malfunction diagnostics tool or the like), called On-Board Diagnostics 2 (OBD2) in the onboard network, which is used for ECU diagnosis. As of recent, the diagnostic port can be used not only for diagnosis but also of rewriting firmware of the ECU. Additionally, external tools that can be connected to the diagnostic port are being sold inexpensively, and there is an increase in external tools that general users who are not professionals can use.

Accordingly, there is an increased risk of an unauthorized external tool being connected to the diagnostic port. Unauthorized rewriting of the firmware of the ECU on the onboard network by an unauthorized tool enables the vehicle to be unauthorizedly controlled. There is a method for preventing such unauthorized rewriting of firmware via the diagnostic port, where an identification code is embedded in a firmware update request message that the external tool transmits, and updating of the firmware is permitted in a case where the identification code matches a registration code (see Japanese Unexamined Patent Application Publication No. 2013-141948). However, the method in Japanese Unexamined Patent Application Publication No. 2013-141948 has a risk that the firmware of all ECUs will be rewritten in a case where the identification code given to the external tool that updates the firmware is leaked.

SUMMARY

One non-limiting and exemplary embodiment provides an update management method that causes an external tool to update data within ECUs such as firmware or the like, while reducing the risk of the firmware of all ECUs being unauthorizedly rewritten in a case where secret information given to the external tool is leaked. The present disclosure also provides an update management device for causing the external tool to update data within ECUs while reducing risk, and a control program for this update management device.

In one general aspect, the techniques disclosed here feature an update management method, used in an onboard network system having a plurality of electronic control units (ECUs) that perform communication via a bus, to which an external tool is connected. An update management device that is one electronic control unit of the plurality of electronic control units is caused to store a shared key used in transmission of a first session key for encryption processing between the update management device and an electronic control unit other than the update management device, and an expiration date of the shared key. In a case where the update management device receives an update message from the external tool instructing updating of the shared key, the update management device is caused to verify update authority information indicating authority of the external tool, and determine whether or not transmission of the update message is within a range of authority of the external tool, (i) wherein, in a case where verification of update authority information indicating the authority of the external tool has been successful, and determination has been made that the update authority information indicates that transmission of the update message by the external tool with within the range of authority of the external tool, the update management device is caused to transfer the update message to the bus, and (ii) wherein, in a case where verification of the update authority information has failed, or determination has been made that the update authority information does not indicate that transmission of the update message by the external tool with within the range of authority of the external tool, the update management device is caused to inhibit the transfer. The update management device is caused to acquire external point-in-time information, is caused to determine whether or not the point-in-time information is before the expiration date, and in a case where the point-in-time information is a predetermined amount of time before the expiration date or the expiration date has passed, is caused to transmit an alert message prompting updating of the shared key.

According to the present disclosure, an external tool is caused to update data within ECUs while reducing the risk of the firmware of all ECUs being unauthorizedly rewritten in a case where secret information given to the external tool is leaked.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating the configuration of a public key certificate;

FIG. 5 is a diagram illustrating correlations between levels of update authority information described in a public key certificate, and ECU function types;

FIG. 14 is a diagram illustrating level information according to the second embodiment;

FIG. 22 is a diagram illustrating log information stored by a server according to the fourth embodiment.

DETAILED DESCRIPTION

Figure 1:
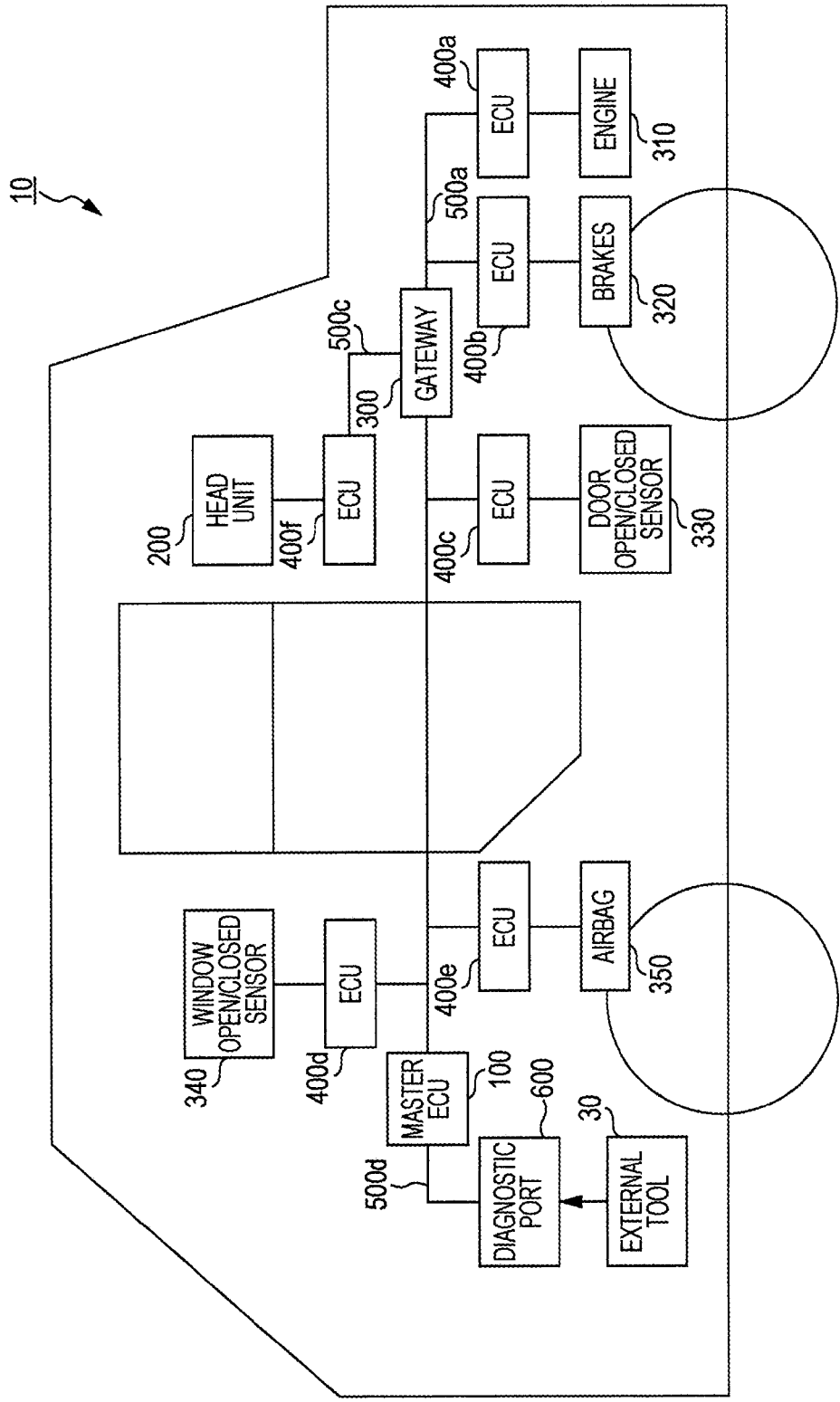
FIG. 1 is an overall configuration diagram of an onboard network system according to a first embodiment.

An update management method according to an aspect of the present disclosure is an update management method used in an onboard network system having a plurality of electronic control units that perform communication via a bus, to which an external tool is connected. Update authority information indicating authority of the external tool is received and verified. In a case that an update message instructing updating of data stored in one or a plurality of the electronic control units has been transmitted from the external tool. If the verification is successful and the update authority information indicates that the transmission of the update message is within the range of authority of the external tool, the update is executed by the one or plurality of electronic control units corresponding to the update message. If the verification fails, or the update authority information does not indicate that the transmission of the update message is within the range of authority of the external tool, the update by the one or plurality of electronic control units corresponding to the update message is inhibited. Accordingly, authority for transmitting an update message instructing updating of data within ECUs is set to be different for each external tool, by verifiable update authority information. Only an external tool that has authority to transmit an update message for data within a part of the ECUs in the onboard network system can cause the data within the part of ECUs to be updated. Even if secret information regarding the external tool that has the authority to transmit the update message for data within the part of ECUS is leaked, ECUs other than the part of ECUS are not unauthorizedly rewritten. Accordingly, the risk of the firmware or the like of all ECUs in the onboard network being unauthorizedly rewritten can be reduced in updating data within ECUs by the external tool.

The plurality of electronic control units may perform communication over the bus following a Controller Area Network (CAN) protocol, and the external tool may transmits the update message following the CAN protocol. Accordingly, the data within ECUs can be updated by an external tool having appropriate authority in the onboard network system following CAN.

Also, in a case where the update message is transmitted from the external tool, determination may be made based on the message ID of the update message regarding whether or not the update authority information indicates that transmission of the update message is within the range of authority of the external tool, and if determination is made that the update authority information indicates that the transmission of the update message is within the range of authority of the external tool, the update may be executed by the electronic control unit set to receive the update message having the message ID. Accordingly, whether or not this is an ECU that is the object of the update instruction in the update message can be distinguished by the ID (message ID) of the CAN frame. Thus, the authority of updating one or multiple particular ECUs can be distinguished from the authority of updating other one of multiple particular ECUs, and the updating thereof can be permitted having been restricted to an appropriate external tool having authority corresponding to the ECU that is the object of the update instruction, for example.

Also, an arrangement may be made where the update authority information identifies one or a plurality of function types out of a plurality of function types for classifying the electronic control units, and the external tool has authority to cause the electronic control unit, classified to any of the identified one or plurality of function types, to perform the update, and in a case where the update message is transmitted from the external tool, the determination is performed by determining, based on the message ID of this update message, whether or not the function type of the electronic control unit set to receive this message ID matches any of the one or plurality of function types identified by the update authority information. Accordingly, operation can be performed where external tools are certified with authority for updating having been distinguished, for each function type classifying ECUs by function. This certification is performed by giving verifiable update authority information, for example.

Also, the update authority information may indicate one level out of a plurality of levels for identifying the one or plurality of function types, where a relatively high level identifies a plurality of function types encompassing one or a plurality of function types that a relatively low level encompasses. Accordingly, the level of authority for updating can be changed for each external tool. Thus, even if secret information leaks from an external tool having low-level authority, ECUs having function types other than the ECU updatable in accordance with that level (i.e., ECUs updatable by an external tool having a high-level authority) are not unauthorizedly rewritten, for example.

Also, an arrangement may be made wherein update management device that is one of the electronic control units receives the update authority information from the external tool connected to the diagnostic port to which the update management device is connected and performs the verification, receives the update message in a case where the update message has been transmitted from the external tool, and in a case of having performed the reception, if the verification is successful and the update authority information indicates that the transmission of the update message is within the range of authority of the external tool, transfers the update message to the bus, while if the verification fails, or the update authority information does not indicates that the transmission of the update message is within the range of authority of the external tool, inhibits the transfer. Accordingly, the update management device (master ECU) controls whether or not to transfer an update message to other ECUs, so other ECUs can omit verification relating to authority of the external tool.

Also, an arrangement may be made wherein, in a case where the update message has not been subjected to predetermined encryption processing using a session key, the updating by the electronic control unit corresponding to the update message is inhibited, and wherein the update management device performs the reception of the update authority information by reception of a public key certificate relating to a public key of the external tool, in which is described the update authority information, and in a case where the verification is successful, encrypts the session key used to subject the update message to the predetermined encryption processing at the time of the external tool transmitting the update message, using the public key of the external tool, and transmits to the external tool. Accordingly, the updating authority of the external tool can be certified by issuing a public key certificate. Also, security relating to the content of communication by the external tool can be secured by using the public key in the public key certificate.

Also, in a case where the update message has been transmitted from the external tool, the update management device may inhibit transfer of the update message to the bus if a state of a vehicle in which the onboard network system is installed is not a predetermined state. Accordingly, by setting a stopped state or an engine-stopped state or the like, for example, as the predetermined state, enables data within an ECU related to driving, for example, to be updated in a stopped state when the load of the ECUs is low and bus traffic is relatively light, so the probability that trouble will occur during updating or the like for example, can be reduced.

Also, in a case where the update message has been transmitted from the external tool, the update management device may inhibit transfer of the update message to the bus if a battery that supplies electric power to the electronic control units of the onboard network system does not have a predetermined remaining charge. Accordingly, setting a sufficient remaining charge for the battery for updating, for example, as the predetermined remaining charge, enables trouble due to dead battery while updating to be prevented.

Also, an arrangement may be made where the electronic control units other than the update management device and the update management device store a shared key that is mutually shared, to be used for transfer of a session key of encryption processing relating to content of communication, and the update of data that the electronic control unit stores, instructed by the update message, is updating of the shared key. Accordingly, shared keys shared between the master ECU and other ECUs can be updated by the external tool.

Also, warning information, prompting updating of the shared key, may be output a predetermined period before an expiration date of the shared key. Accordingly, updating of the key can be prompted before the expiration date of the shared key, and risk of the shared key continuing to be used after the expiration date has passed can be reduced.

Also, the update management device may transmit, to the external tool, identification information identifying the onboard network system out of multiple onboard network systems, and results information indicating processing results of the update message. Accordingly, the update results of data within the ECUs can be managed for each vehicle (i.e., for each onboard network system) at the external tool side.

Also, the external tool may transmit the results information and the identification information to a server. Accordingly, the update results of data within the ECUs can be managed for each vehicle at the server.

Also, the update of data of data that the electronic control unit stores, instructed by the update message, may be updating of firmware of the electronic control units. Accordingly, authority for updating firmware of the ECUs can be flexibly set for each external tool.

An update management device according to an aspect of the present disclosure is an update management device, that is one electronic control unit connected to a diagnostic port in an onboard network system having a plurality of electronic control units that perform communication via a bus. The update management device includes: a reception unit that receives, from an external tool connected to the diagnostic port, update authority information indicating the authority of the external tool and an update message instructing updating of data that one or a plurality of electronic control units store, that are transmitted via the diagnostic port; a verification unit that verifies the update authority information received by the reception unit; and a transfer unit that, in a case where the update message has been received by the reception unit, if the verification by the verification unit is successful and the update authority information indicates that the transmission of the update message is within the range of authority of the external tool, transfers the update message to the bus, and if the verification by the verification unit fails, or the update authority information does not indicate that the transmission of the update message is within the range of authority of the external tool, inhibits the transfer. Accordingly, the risk of the firmware or the like of all ECUs being unauthorizedly rewritten can be reduced in updating data within ECUs by the external tool, in a case where secret information given to the external tool is leaked.

A control program according to an aspect of the present disclosure is a control program to cause an update management device having a processor, that is one electronic control unit connected to a diagnostic port in an onboard network system having a plurality of electronic control units that perform communication via a bus, to perform predetermined update management processing. The update management processing includes: an update authority information reception step, of receiving, from an external tool connected to the diagnostic port, update authority information indicating the authority of the external tool, that is transmitted via the diagnostic port; a verification step of verifying the update authority information received in the update authority information reception step; an update message reception step of receiving an update message that is transmitted from the external tool via the diagnostic port, instructing updating of data that one or a plurality of electronic control units store; and a transfer control step of, in a case where the update message has been received in the update message reception step, if the verification in the verification step is successful and the update authority information indicates that the transmission of the update message is within the range of authority of the external tool, transferring the update message to the bus, and if the verification in the verification step fails, or the update authority information does not indicate that the transmission of the update message is within the range of authority of the external tool, inhibiting the transfer. Accordingly, by installing this program in the update management device and causing the processor to execute the program, the risk of the firmware or the like of all ECUs being unauthorizedly rewritten can be reduced in updating data within ECUs by the external tool, in a case where secret information given to the external tool is leaked.

It should be noted that general or specific embodiments may be implemented as a system, a method, an integrated circuit, a computer program, a storage medium such as a computer-readable compact disc-read only memory (CD-ROM) or the like, or any selective combination of a system, a method, an integrated circuit, a computer program, and a storage medium.

An onboard network system that uses the update management method according to embodiments will be described below with reference to the drawings. It should be noted that each of the embodiments illustrated here is a general or specific exemplification of the present disclosure. Accordingly, values, components, placements and connection states of components, and steps (processes) and order of steps, and so forth, in the embodiments are only exemplary, and do not restrict the present disclosure. Components in the following embodiments, which are not included in an independent Claim indicating the highest concept, are described as being optional components. The drawings are schematic drawings, and are not necessarily precise illustrations.

First Embodiment

An update management method used in an onboard network system 10 where multiple ECUs, including a master ECU 100 serving as an update management device, communicate via busses, will be described as an embodiment of the present disclosure with reference to the drawings. An example will be described of an update management method in the present embodiment where the master ECU 100 verifies an external tool 30 in a case where an external tool is connected to a diagnostic port of the onboard network system 10, and only in a case where certain conditions are satisfied, is the external tool 30 permitted to update data (firmware, etc.) of the ECUs.

1.1 Overall Configuration of Onboard Network System 10

FIG. 1 is a diagram illustrating an overall configuration of the onboard network system 10 according to the first embodiment. FIG. 1 also illustrates the external tool 30 besides the onboard network system 10. This external tool 30 representatively represents, for example, manufacturing of various types of ECUs, each of various types of external tools (e.g., later-described external tools 30a and 30b) manufactured by businesses and the like that perform maintenance. The onboard network system 10 is an example of a network communication system where communication is performed following the CAN protocol, and is a network communication system in an automobile (vehicle) to which various types of devices, such as control devices, sensors, and so forth, have been installed. The onboard network system 10 has multiple devices (nodes) that perform communication by frames via the busses following the CAN protocol, and uses the update management method. Specifically, as illustrated in FIG. 1, the onboard network system 10 is configured including a diagnostic port 600, busses 500a through 500d, and various nodes connected to busses, such as the master ECU (update management device) 100, a head unit 200, a gateway 300, ECUs 400a through 400f and the like connected to various types of devices, and so forth. Although many ECUs other than the master ECU 100 and ECUs 400a through 400f may be included in the onboard network system 10, description will be made here with particular focus on the master ECU 100 and ECUs 400a through 400f, for the sake of convenience. An ECU is, for example, a device including a digital circuit such as a processor (microprocessor), memory, and so forth, an analog circuit, a communication circuit, and so forth. Memory is read-only memory (ROM), random access memory (RAM), and so forth, and can store control programs (computer programs) executed by a processor. For example, the ECU can realize various functions by the processor operating in accordance with control programs. Note that a computer program is configured by combining multiple command codes indicating commands to the processor, to achieve predetermined functions.

The diagnostic port 600 is a port for connecting the external tool 30 to, in a case of performing maintenance of the ECUs making up the onboard network system 10, and is connected to the master ECU 100 by the bus 500d. The diagnostic port 600 is a connector compliant with OBD2, for example. The external tool 30 can transmit frames following the CAN protocol to the onboard network system 10 by connecting to the diagnostic port 600. For example, the external tool 30 can transmit messages including message IDs of a predetermined certain range in the onboard network system 10, such as an update message to update firmware of an ECU, a diagnostic message for malfunction diagnosis of an ECU, or the like. Description will be made here with particular focus on the external tool transmitting an update message (i.e., an update requesting frame) including a message ID within the certain range determined beforehand, for updating each of firmware and shared keys of an ECU.

The master ECU 100 is a type of an ECU serving as an update management device, having the role of performing verification of the external tool 30, and making determination or the like regarding whether or not to permit updating in accordance with the update message from the external tool, based on update authority information described in a certificate (later-described public key certificate) of the external tool 30. The master ECU 100 also has a function of storing the same shared key that has been shared beforehand with one or more ECU other than itself out of the multiple ECUs in the onboard network system 10, to be used for transmitting a session key for encryption processing regarding content of communication in frames, and transmitting session keys to the ECUs.

The ECUs 400a through 400f are connected to one of the busses 500a through 500c, and are respectively connected to an engine 310, brakes 320, door open/closed sensor 330, window open/closed sensor 340, airbag 350, and head unit 200. The ECUs 400a through 400e each acquire the state of devices connected thereto (the engine 310, etc.), and periodically transmit frames representing the state to the network (i.e., bus). The head unit 200 includes, for example, a display device such as a liquid crystal display (LCD) or the like provided to an instrument panel of an automobile or the like, and can notify the driver of the vehicle. The ECU 400f connected to the head unit 200 has a function of receiving frames from the bus 500c, and displaying various states represented by the frames, on the display device of the head unit 200.

The gateway 300 connects to the bus 500a connected to the ECU 400a and ECU 400b, to the bus 500b connected to the master ECU 100 and ECUs 400c through 400e, and to the bus 500c connected to the ECU 400f, and has a function of transferring frames received from each of the busses to other busses. Whether or not to transfer received frames can be switched for each connected bus. The gateway 300 is a type of ECU.

The ECUs including the master ECU 100 in the onboard network system 10 exchange frames via the busses, following the CAN protocol. Although frames in the CAN protocol include data frames, remote frames, overload frames, and error frames, description will be made primarily regarding data frames here, for sake of convenience of description.

1.2 Data Frame Format

Figure 2:
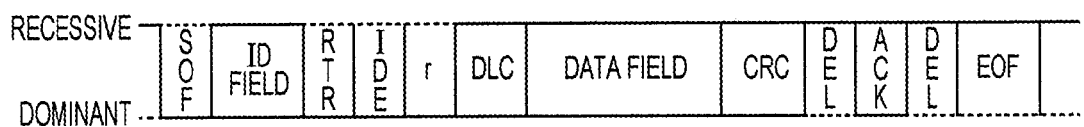
FIG. 2 is a diagram illustrating a data frame format stipulated by the CAN protocol.

The following is a description of a data frame which is a type of frame used on a network following the CAN protocol. FIG. 2 is a diagram illustrating a format of a data frame stipulated by the CAN protocol. FIG. 2 illustrates a data frame according to a standard ID format stipulated in the CAN protocol. A data frame is configured including the fields of a Start Of Frame (SOF), ID field, Remote Transmission Request (RTR), Identifier Extension (IDE), reserved bit "r", Data Length Code (DLC), data field, Cyclic Redundancy Check (CRC) sequence, CRC delimiter "DEL", Acknowledgement (ACK) slot, ACK delimiter "DEL", and End Of Frame (EOF).

The SOF is made up of 1-bit dominant. The state of the bus is recessive when idle, and start of transmission of a frame is notified by being changed to dominant by the SOF.

The ID field is made up of 11 bits, and is a field storing an ID (i.e., message ID) that is a value indicating the type of data. Design has been implemented so that in a case where multiple nodes start transmission at the same time, frames with smaller ID values are given higher priority, in order to perform communication arbitration using this ID field.

The RTR is a value identifying a data frame and remote frame, and is made up of 1-bit dominant in a data frame.

The IDE and "r" are each made up of 1-bit dominant.

The DLC is made up of four bits, and is a value indicating the length of the data field. Note that the IDE, r, and DLC are collectively referred to as a control field.

The data field is a maximum of 64 bits, and is a value indicating the content of the data being transmitted. The length can be adjusted in 8-bit increments. The CAN protocol does not stipulate the specification of data being transmitted; that is set at the onboard network system 10. Accordingly, the specification is dependent on the model, manufacturer (maker), or the like.

The CRC sequence is made up of 15 bits. This is calculated from the transmitted values of the SOF, ID field, control field, and data field.

The CRC delimiter is made up of 1-bit recessive, and is a sectioning symbol representing the end of the CRC sequence. The CRC sequence and CRC delimiter are collectively referred to as the CRC field.

The ACK slot is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominance after transmission, so the transmitting node will be able to confirm that one of the receiving nodes has succeeded in reception of the ACK slot.

The ACK delimiter is made up of 1-bit recessive, and is a sectioning symbol representing the end of the ACK.

The EOF is made up of 7-bits recessive, and represents the end of the data frame.

1.3 Key Issuing System

Figure 3:
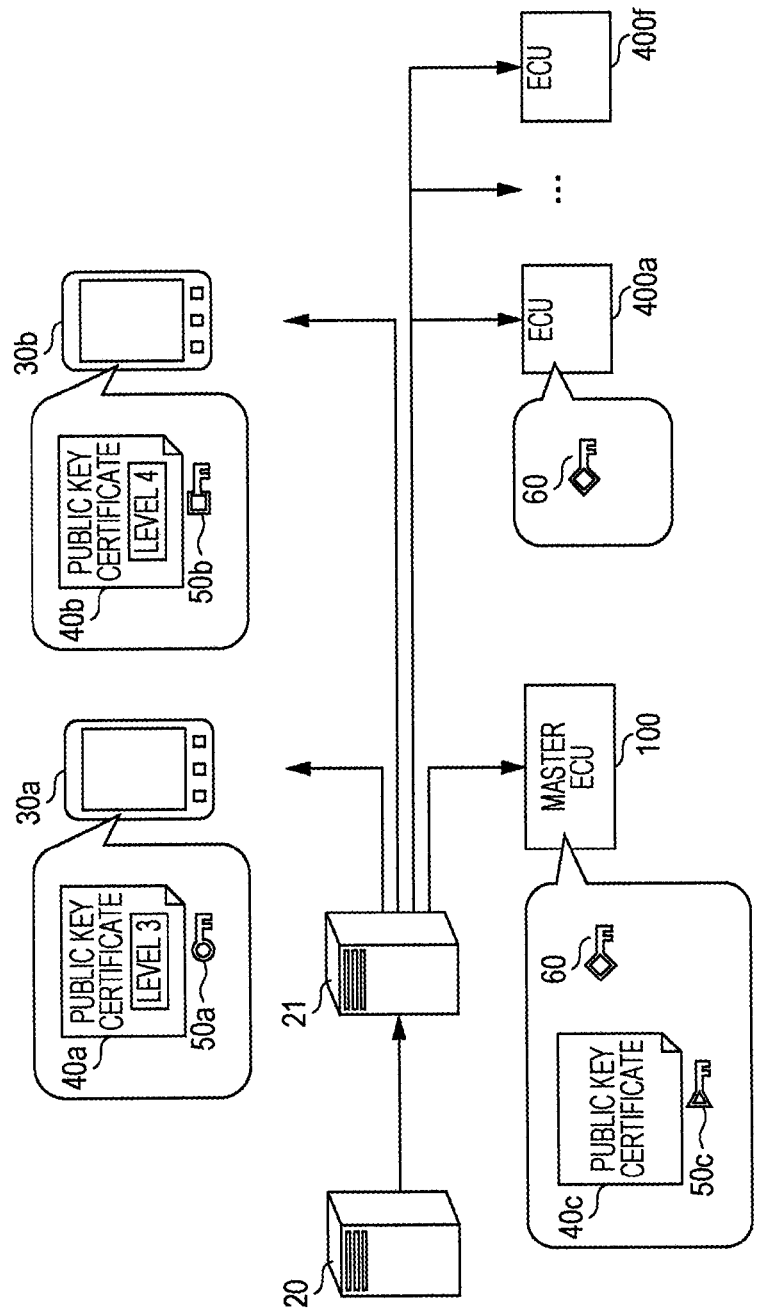
FIG. 3 is a diagram illustrating a key issuing system related to ECUs and an external tool.

FIG. 3 is a diagram illustrating a key issuing system relating to the above-described ECUs and external tool. A key issuing authority 20 distributes public key certificates 40a through 40c, secret keys 50a through 50c, and a shared key 60, to a manufacturer 21. The distributed keys and certificates are written to the external tools 30a and 30b, the master ECU 100, and the ECUs 400a through 400f at the manufacturing stage or the like by the manufacturer 21. The manufacturer 21 is, for example, an OEM maker (Original Equipment Manufacturer), an ECU vendor, or the like. The public key certificate describing the public key, and the secret key, are used in a public key infrastructure (PKI), and the public key and secret key are a key pair in elliptic curve cryptography, RSA cryptography, or the like. The secret key and public key certificate are used for authentication between the master ECU 100 and external tools 30a and 30b. The shared key 60 representatively represents individual shared keys. This shared key 60 is an AES (Advanced Encryption Standard) key in shared-key cryptography, that is shared between the master ECU 100 and the ECUs, and is used for transmitting session keys for encryption processing regarding frames. In addition to encryption and decryption of the content of the data field in a frame, examples of encryption processing regarding frames include generating a message authentication code (MAC) and attaching this to the data field of a frame at the frame transmission side and transmitting, and processing at the receiving side of verifying this MAC. The MAC enables detection of data tampering. The session key is used to generate MACs, for example.

In the example in FIG. 3, it is illustrated that the public key certificate 40a and secret key 50a are written to the external tool 30a, the public key certificate 40b and secret key 50b are written to the external tool 30b, the public key certificate 40c and secret key 50c and shared key 60 are written to the master ECU 100, and the shared key 60 is written to the ECUs 400a through 400f. In the example in FIG. 3, the level of update authority information described in the public key certificate 40a is 3, and the level of update authority information described in the public key certificate 40b is 4.

1.4 Public Key Certificate

FIG. 4 is a diagram illustrating an example configuration of the public key certificate 40a that the key issuing authority 20 issues, i.e., distributes, to be written to the external tools 30a and 30b. The public key certificate 40b has the same configuration as well.

As illustrated in FIG. 4, the public key certificate includes version, issuer, start and end of valid period, certificate identification information (ID), public key, update authority information (level), and signature for these. The signature is issued by the key issuing authority 20 or a certificate authority such as a portal server or the like. Accordingly, the master ECU 100 can perform authentication of the external tool 30 by acquiring the public key certificate from the external tool 30 and performing verification of the signature and the like.

The update authority information in the public key certificate is information indicating which types of ECUs the external tool 30 (external tools 30a, 30b, etc.) is permitted to have authority for transmission of an update message instructing updating of the data within the ECU. Specifically, this indicates one level of multiple stages that authority has been sectioned into. Accordingly, the level of authority certified by the certificate authority or the like that is the signature entity of the external tool 30 indicates the update authority information.

Note that the public key certificate 40c written to the master ECU 100 has each element in the configuration example illustrated in FIG. 4 other than the update authority information.

1.5 Update Authority Information

FIG. 5 is a diagram illustrating an example of the correlation between the level that is the content of the update authority information described in the public key certificate in FIG. 3 (i.e., authority level), and multiple function types for classifying ECU functions.

First, ECU function types will be described. Drive-related functions are functions related to driving of the vehicle, such as control of the engine, electric motor, fuel, battery, transmission, and so forth. The ECU 400a that relates to the engine 310, for example, comes under the drive-related function type. Chassis-related functions are functions relating to control of behavior and so forth of the vehicle such as "turning" and "stopping" and so forth, by the brakes, steering, and so forth. The ECU 400b that relates to the brakes 320, for example, comes under the chassis-related function type. Body-related functions are functions relating to control of equipment of the vehicle such as door locks, air conditioning, lights, turn indicators, and so forth. The ECU 400c that relates to the door open/closed sensor 330 and the ECU 400d that relates to the window open/closed sensor 340, for example, come under the body-related function type. Safety/comfort functions are functions for automatically realizing safe and comfortable driving, such as automatic braking, lane keeping functions, inter-vehicle distance keeping functions, collision-prevention functions, airbags, and so forth. The ECU 400e that relates to the airbag 350, for example, comes under the safety/comfort-related function type. ITS (Intelligent Transport Systems) related functions are functions handling freeway traffic systems such as the Japanese Electronic Toll Collection System (ETC) and so forth. Telematics-related functions are functions handling services using mobile telecommunication. The infotainment-related functions are entertainment functions relating to automotive navigation, audio, and so forth. The ECU 400f that relates to the head unit 200, for example, comes under the infotainment-related function type.

One or multiple function types of the above-described multiple function types is identified for the authority level, which is the content of the update authority information certified by the certificate authority or the like that is the signature entity of the public key certificate, based on the correlation exemplified in FIG. 5. The external tool that has been given that public key certificate is thus certified to have authority to cause an ECU classified to the one or multiple function types identified by the level of the update authority information, i.e., authority for transmitting an update message for updating firmware or shared keys, to perform updating of data (firmware, shared key) within that ECU.

According to the example in FIG. 5, public key certificates in which are described update authority information indicating one level from the four stages of level 4, which is the highest, to level 1, which is the lowest, regarding update authority, are given (i.e., written) to each of the external tools. The functions, configuration, and so forth of individual external tools may each be different. Accordingly, update authority information for each external tool can be determined taking into account the function type of the ECU that the external tool is going to handle, the confidentiality and reliability of the external tool, the reliability of the manufacturer manufacturing the external tool, and so forth, for example. It should be noted that FIG. 5 is only an illustration of an example of levels, and that the number of stages of levels, the correlation between levels and function types, and so forth, may be determined in a different way from this example. Also, a correlation may be determined where multiple levels (e.g., level 4 and level 2) each correspond to a single function type. Also, classification of the function types may be determined to be different from the example in FIG. 5. Description will be made here with the understanding that a relatively high level in the update authority information identifies multiple function classifications encompassing one or multiple function types identified by lower levels, i.e., that a higher level encompasses authority of lower levels. However, the correlation between levels and function types may be determined so that there is no encompassing of authority among authority levels. Nonetheless, in a case where the authority level certified for the external tool is relatively low, it is useful to permit only updating of data within some ECUs not related to driving and behavior of the vehicle and so forth and to not allow updating of data within ECUs other than these some ECUs. Specifically, if the level of authority permitted to the external tool (i.e., the level that is the content of the update authority information) is 3, that external tool is permitted to transmit update messages to each ECU classified in function types corresponding to all levels 3 and lower (i.e., level 1 through level 3) and execute updating of data within the ECUs.

In a case where a external tool 30 is connected to the diagnostic port 600, the master ECU 100 in the onboard network system 10 performs determination regarding whether or not to permit updating relating to the update message that the external tool 30 transmits, based on the update authority information received from the external tool 30 stipulating the authority level. In this determination, the master ECU 100 references level information 1040 determined based on the above-described correlation between the levels and function types (see FIG. 5). The level information 1040 will be described later with reference to FIG. 8.

1.6 Shared Keys

Figure 6:
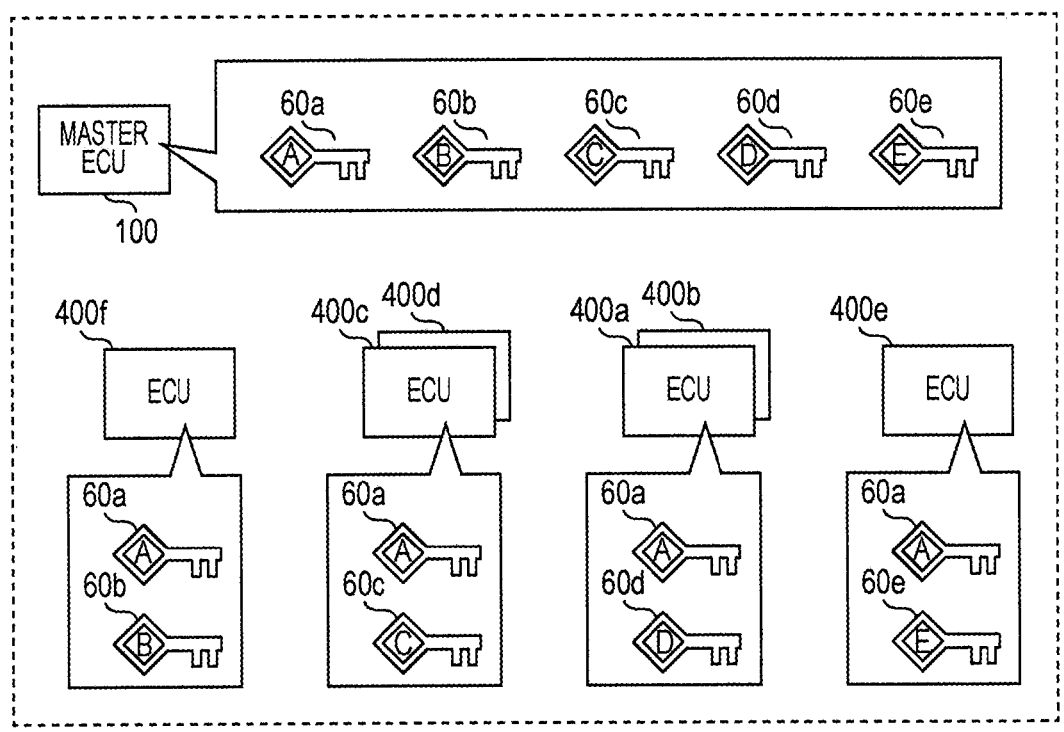
FIG. 6 is a diagram illustrating shared keys that ECUs store.

FIG. 6 is a diagram illustrating shared keys that the master ECU 100 and the ECUs 400a through 400f store. The shared key 60 described above specifically includes a shared key 60a shared by all ECUs, a shared key 60b shared by the ECU 400f and master ECU 100, a shared key 60c shared by the ECU 400c and 400d and master ECU 100, a shared key 60d shared by the ECU 400a and 400b and master ECU 100, and a shared key 60e shared by the ECU 400e and master ECU 100 as illustrated in FIG. 6.

1.7 Configuration of Master ECU (Update Management Device) 100

Figure 7:
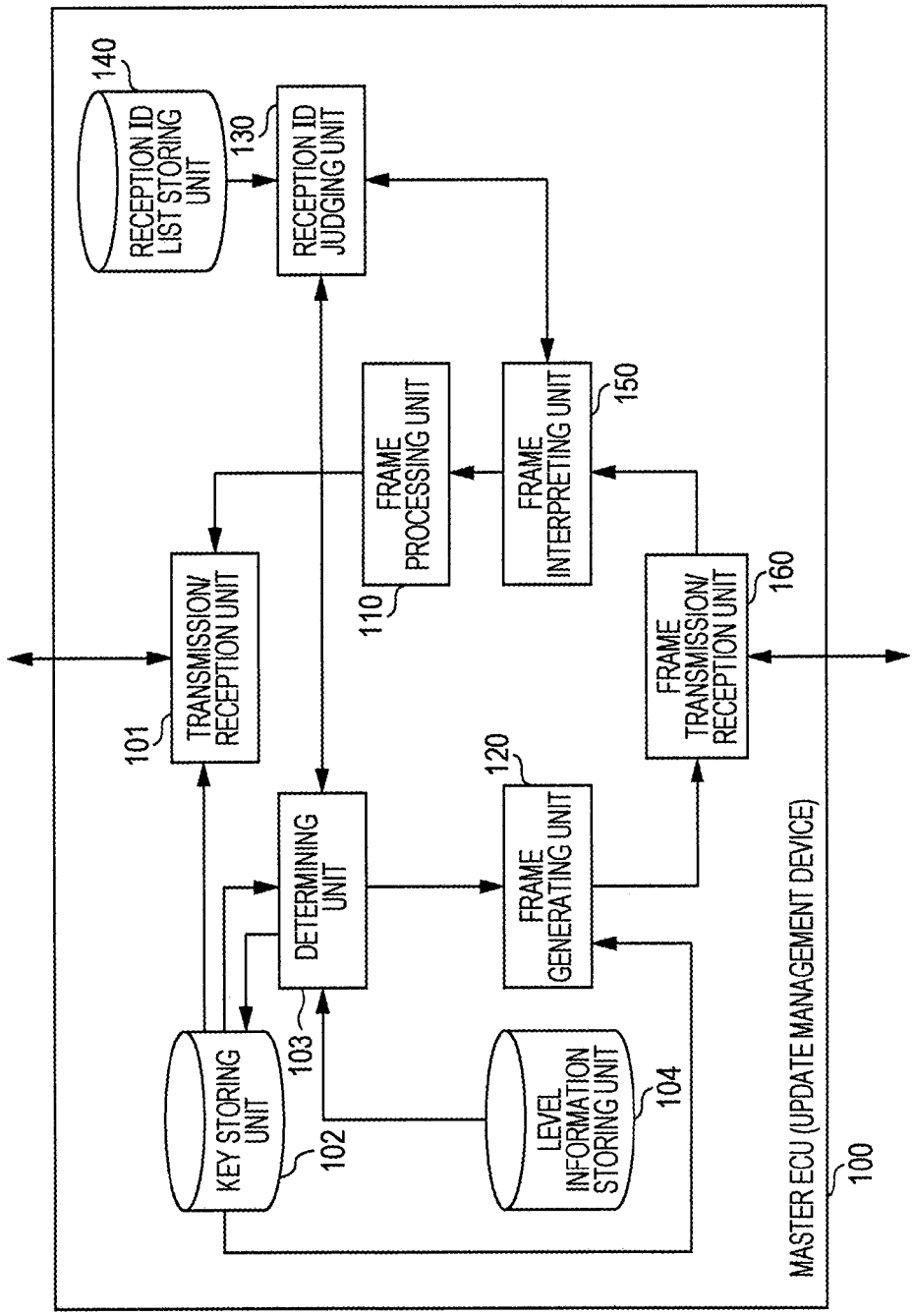
FIG. 7 is a configuration diagram of a master ECU (update management device) according to the first embodiment.

FIG. 7 is a configuration diagram of the master ECU 100. The master ECU 100 includes a transmission reception unit 101, a key storing unit 102, a determining unit 103, a level information storing unit 104, a frame transmission/reception unit 160, a frame interpreting unit 150, a reception ID judging unit 130, a reception ID list storing unit 140, a frame processing unit 110, and a frame generating unit 120. These components are functional components, and the functions thereof are realized by a communication circuit in the master ECU 100, a processor or digital circuit or the like that executes control programs stored in memory, or the like.

The transmission/reception unit 101 transmits the public key certificate 40c of the master ECU 100 and receives the public key certificate from the external tool 30 (public key certificate 40a or public key certificate 40b), for authentication of the master ECU 100 and external tool 30 (external tools 30a and 30b). The transmission/reception unit 101 also receives an update message following the CAN protocol, transmitted to the bus 500d from the external tool 30 via the diagnostic port 600, and transmits update results by update message.

The key storing unit 102 stores the public key certificate 40c, secret key 50c, and shared keys 60a through 60e, of the master ECU 100. The key storing unit 102 may also store a MAC key used in a case of imparting a MAC as encryption processing of data in a data frame following the CAN protocol. Session keys used for encryption processing relating to communication with the external tool 30 or the like may also be stored in the key storing unit 102. Session keys may also be used to generate MACs.

The frame transmission/reception unit 160 transmits and receives frames following the CAN protocol to and from the bus 500b, i.e., receives frames from the ECUs 400a through 400f, and transmits frames to the ECUs 400a through 400f. Frames are received from the bus 500b one bit at a time, and transmitted to the frame interpreting unit 150. The content of a frame regarding which notification has been received from the frame generating unit 120 is transmitted to the bus 500b one bit at a time.

The control frame interpreting unit 150 receives values of frames from the frame transmission/reception unit 160, and interprets so as to map to the fields in the frame format stipulated in the CAN protocol. The frame interpreting unit 150 receives a value judged to be an ID field (message ID) and transfers to the reception ID judging unit 130. Whether to transfer the value of the ID field and the data field that follows the ID field to the frame processing unit 110, or to cancel reception of the frame (i.e., to cancel interpretation of the frame) is decided in accordance with the determination results notified from the reception ID judging unit 130. In a case where determination is made that the frame does not conform to the CAN protocol, the frame generating unit 120 is notified to transmit an error frame. In a case of having received an error frame, i.e., in a case of having interpreted that the received frame is an error frame from the value thereof, the frame interpreting unit 150 discards that frame thereafter, i.e., cancels interpretation of the frame.

The reception ID judging unit 130 receives the value of the ID field notified from the frame interpreting unit 150, and determines whether or not to receive the fields of the frame following the ID field, in accordance with a list of message IDs that the reception ID list storing unit 140 stores. The reception ID judging unit 130 notifies the determination results to the frame interpreting unit 150. The reception ID judging unit 130 also performs determination of whether or not the message ID should be received, and notifies the determining unit 103 of the determination results, in the same way as the frame interpreting unit 150.

The reception ID list storing unit 140 stores a reception ID list which is a list of message IDs that the master ECU 100 receives.

The frame generating unit 120 configures an error frame in accordance with an error frame transmission request notified from the frame interpreting unit 150, and transmits the error frame to notify the frame transmission/reception unit 160. Upon receiving an instruction to generate a frame from the determining unit 103, the frame generating unit 120 subjects data to encryption processing (e.g., adding a MAC or the like corresponding to the session key or the like) and configures a frame, and transmits to notify the frame transmission/reception unit 160.

The determining unit 103 authenticates the external tool 30 by verifying the public key certificate including the update authority information received from the external tool 30. Upon the determining unit 103 successfully verifying the public key certificate received from the external tool 30, authentication of the external tool 30 is successful. Note that the determining unit 103 successfully verifying the public key certificate also means that verification of the update authority information has been successful. In a case where an update message has been received by the transmission/reception unit 101, the determining unit 103 determines whether or not to permit updating corresponding to the update message, by determining whether or not verification of the update authority information has been successful and also the update authority information indicates that transmission of the update message is within the range of authority of the external tool 30. This determination is made by determining whether or not the message ID of the received update message and the level that the update authority information described in the received public key certificate suitably corresponding to level information 1040 (described later) stored by the level information storing unit 104. In a case where determination is made that the transmission of the update message performed by the external tool 30 is within the range of authority of the external tool 30 (i.e., determination is made that the update message is permissible), the determining unit 103 instructs the frame generating unit 120 to generate a new update message corresponding to that (original) update message, for transfer to other ECUs (i.e., to send out onto the bus 500b). The new update message that the frame generating unit 120 generates for transferring has the same message ID as the original update message, and the data within the data field of the update message is essentially the same, but encryption processing that the data is subjected to in a case of subjecting the data to encryption processing (e.g., the MAC added to the data) differs. The update message generated at the frame generating unit 120 is sent out onto the bus 500b by the frame transmission/reception unit 160. Accordingly, in a case where determination has been made that verification of the update authority information from the external tool 30 has been successful and also that the update message from the external tool 30 is a permitted update message, the update message is transferred by the master ECU 100 to other ECUs (i.e., to the bus 500b). In a case of having determined that an update message for updating a shared key from the external tool 30 is a permitted update message, the determining unit 103 updates the shared keys stored in the key storing unit 102.

The frame processing unit 110 performs predetermined processing in accordance with the data of the frame received from the bus 500b. For example, in a case of having received a frame indicating the results of updating at each ECU by the update message from the bus 500b, the frame processing unit 110 generates a message (frame) of which the content is the results of this updating, and causes the transmission/reception unit 101 to send this out on the bus 500d connected to the diagnostic port 600.

The level information storing unit 104 stores the level information 1040.

1.8 Level Information

Figure 8:
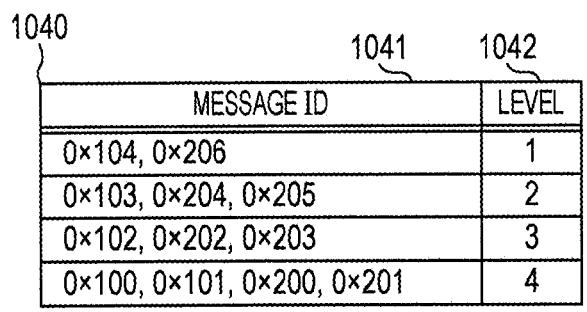
FIG. 8 is a diagram illustrating level information according to the first embodiment.

FIG. 8 is a diagram illustrating an example of level information 1040 that the level information storing unit 104 stores. The level information 1040 is information where message ID 1041 and level 1042 have been correlated, and is used at the determining unit 103 to determine whether or not to permit an update message from the external tool 30.

The message ID 1041 indicates message IDs of update messages that can be transmitted from the external tool 30. Description will be made here regarding an arrangement where "0x100" through "0x104" are stipulated here as message IDs for update messages to update shared keys that the ECUs store, and "0x200" through "0x206" are stipulated as message IDs for update messages to update firmware of the ECUs.

The level 1042 indicates levels of authority necessary to transmit update messages for corresponding message IDs. This level corresponds to the level of the content of the update authority information. For example, if the value of the level indicating the update authority information described in the public key certificate of the external tool 30 is a value indicating authority the same as or higher than the value of the level 1042, this means that the external tool 30 has the authority to transmit the update message of the message ID 1041 correlated with the value of that level 1042. Conversely, if the value of the level indicating the update authority information described in the public key certificate of the external tool 30 is a value indicating authority lower than the value of the level 1042, this means that the external tool 30 does not have the authority to transmit the update message of the message ID 1041 correlated with the value of that level 1042.

The message ID "0x100" illustrated in FIG. 8 is a message ID regarding an update message for updating the shared key 60a that the master ECU 100 and ECUs 400a through 400f store. The value of the level 1042 corresponding to this message ID "0x100" in the level information 1040 is set to 4, which is the highest. This 4 is the value of the highest level of the levels corresponding to the function types of the ECUs that are the object of updating of the shared key 60a, and more specifically is a level corresponding to safety/comfort functions that is a function type of the ECU 400e (see FIG. 5).

The message ID "0x101" is a message ID regarding an updating message for updating the shared key 60e that the master ECU 100 and ECU 400e store. The value of the level 1042 is set to 4, corresponding to the ECU 400e that has the safety/comfort functions.

The message ID "0x102" is a message ID regarding an updating message for updating the shared key 60d that the master ECU 100 and ECUs 400a and 400b store. The value of the level 1042 is set to 3, corresponding to the ECU 400e that has the drive-related functions and the ECU 400b that has the chassis-relating functions.

The message ID "0x103" is a message ID regarding an updating message for updating the shared key 60c that the master ECU 100 and ECUs 400c and 400d store. The value of the level 1042 is set to 2, corresponding to the ECUs 400c and 400d that have the body-related functions.

The message ID "0x104" is a message ID regarding an updating message for updating the shared key 60b that the master ECU 100 and ECU 400f store. The value of the level 1042 is set to 1, corresponding to the ECU 400f that has the infotainment-related functions.

The message ID "0x200" is a message ID regarding an updating message for updating the firmware of the master ECU 100. The value of the level 1042 is set to 4 that is the highest level, giving the master ECU 100 special treatment.

The message ID "0x201" is a message ID regarding an updating message for updating the firmware of the ECU 400e. The value of the level 1042 is set to 4, corresponding to the ECU 400e that has the safety/comfort functions.

The message ID "0x202" is a message ID regarding an updating message for updating the firmware of the ECU 400b. The value of the level 1042 is set to 3, corresponding to the ECU 400b that has the chassis-related functions.

The message ID "0x203" is a message ID regarding an updating message for updating the firmware of the ECU 400a. The value of the level 1042 is set to 3, corresponding to the ECU 400a that has the drive-related functions.

The message ID "0x204" is a message ID regarding an updating message for updating the firmware of the ECU 400c. The value of the level 1042 is set to 2, corresponding to the ECU 400c that has the body-related functions.

The message ID "0x205" is a message ID regarding an updating message for updating the firmware of the ECU 400d. The value of the level 1042 is set to 2, corresponding to the ECU 400d that has the body-related functions.

The message ID "0x206" is a message ID regarding an updating message for updating the firmware of the ECU 400f. The value of the level 1042 is set to 1, corresponding to the ECU 400f that has the infotainment-related functions.

1.9 Configuration of ECU 400a

Figure 9:
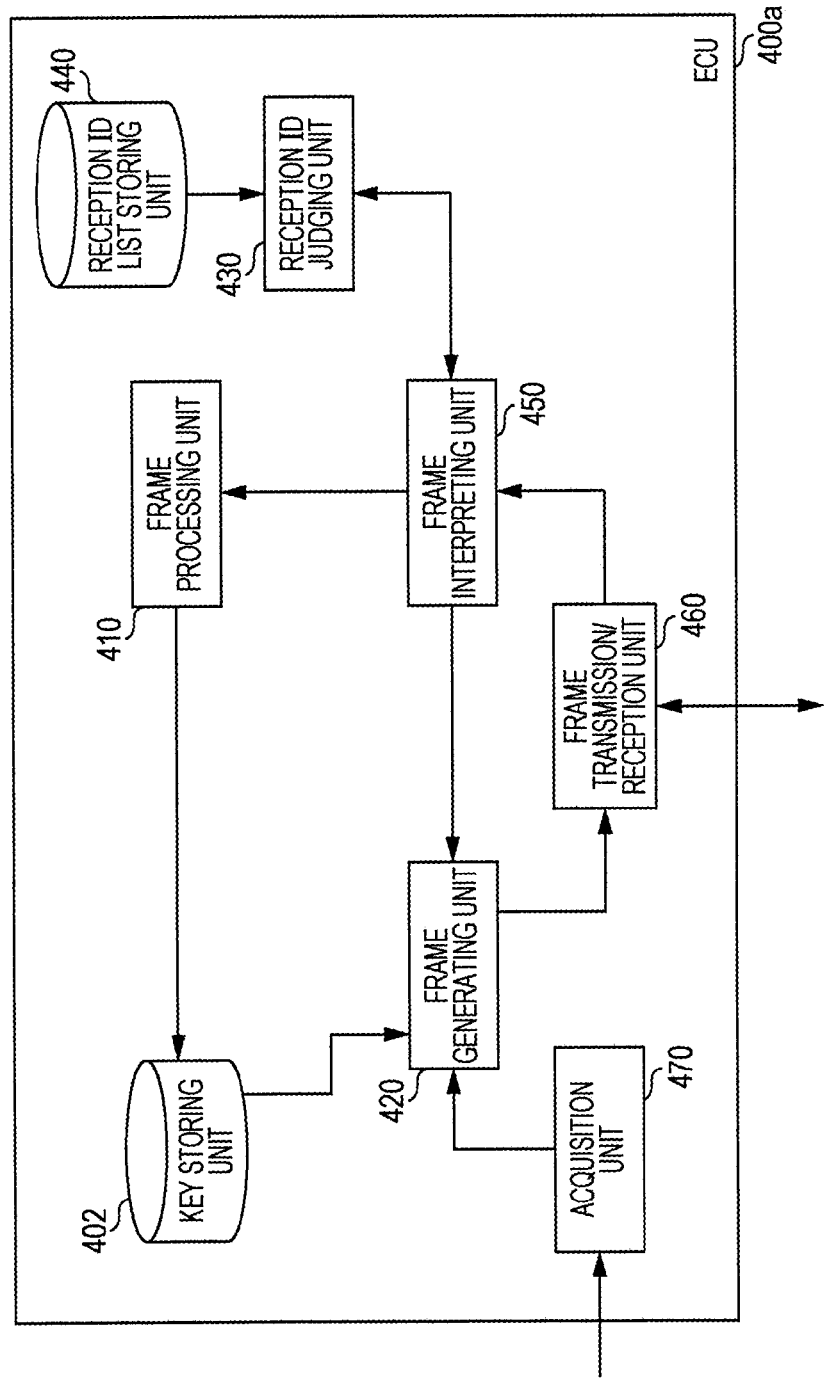
FIG. 9 is a configuration diagram of an ECU.

FIG. 9 is a configuration diagram of the ECU 400a. The ECU 400a includes a key storing unit 402, a frame transmission/reception unit 460, a frame interpreting unit 450, a reception ID judging unit 430, a reception ID list storing unit 440, a frame processing unit 410, a frame generating unit 420, and a data acquisition unit 470. These components are functional components, and the functions thereof are realized by a communication circuit of the ECU 400a, a processor or digital circuit or the like that executes control programs stored in memory, or the like. Note that the ECUs 400b through 400f basically have the same configuration as the ECU 400a.

The key storing unit 402 stores the stores the shared keys illustrated in FIG. 6. That is to say, the key storing unit 402 of the ECU 400a stores the shared keys 60a and 60d. The key storing unit 402 may also store a MAC key used in a case of imparting a MAC as encryption processing of data in a data from following the CAN protocol. Session keys used for encryption processing relating to communication with other ECUs or the like may also be stored in the key storing unit 402. Session keys may also be used to generate MACs.

The frame transmission/reception unit 460 transmits and receives frames following the CAN protocol to and from the bus 500a. Frames are received from the bus 500a one bit at a time, and transmitted to the frame interpreting unit 450.

The content of a frame regarding which notification has been received from the frame generating unit 420 is transmitted to the bus 500a one bit at a time.

The control frame interpreting unit 450 receives values of frames from the frame transmission/reception unit 460, and interprets so as to map to the fields in the CAN protocol. A value judged to be an ID field is transferred to the reception ID judging unit 430. Whether to transfer the value of the ID field (message ID) and the data field that follows the ID field to the frame processing unit 410, or to cancel reception of the frame (i.e., to cancel interpretation of the frame) is decided in accordance with the determination results notified from the reception ID judging unit 430. In a case where determination is made that the frame does not conform to the CAN protocol, the frame generating unit 420 is notified to transmit an error frame. In a case of having received an error frame, i.e., in a case of having interpreted that the received frame is an error frame from the value thereof, the frame interpreting unit 450 discards that frame thereafter, i.e., cancels interpretation of the frame.

The reception ID judging unit 430 receives the value of the ID field notified from the frame interpreting unit 450, and determines whether or not to receive the fields of the frame following the ID field, in accordance with a list of message IDs that the reception ID list storing unit 440 stores. The reception ID judging unit 430 notifies the determination results to the frame interpreting unit 450.

Figure 10:
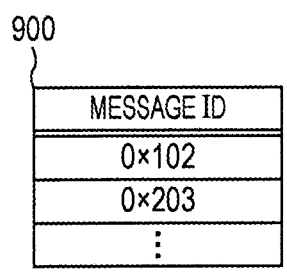
FIG. 10 is a diagram illustrating a reception ID list.

The reception ID list storing unit 440 stores a reception ID list which is a list of message IDs that the ECU 400a receives (see FIG. 10).

The frame processing unit 410 performs processing relating to different functions for each ECU, in accordance with the data in the received frame. For example, the ECU 400a connected to the engine 310 may perform predetermined control in accordance with a relationship between rotations of the engine 310 and the state of a part of the vehicle that data of a frame received from another ECU indicates.

The data acquisition unit 470 acquires data indicating the state of devices and sensors connected to the ECU, and notifies the frame generating unit 420.

The frame generating unit 420 configures an error frame in accordance with an error frame transmission request notified from the frame interpreting unit 450, and transmits the error frame to notify the frame transmission/reception unit 460. The frame generating unit 420 configures a data frame by adding a predetermined message ID to the value of the data field determined based on the data notified from the data acquisition unit 470, and transmits to notify the frame transmission/reception unit 460. Note that the frame generating unit 420 may add a MAC, that has been generated using a MAC key or session key, to the data field.

1.10 Reception ID List

FIG. 10 illustrates an example of a reception ID list 900 that the reception ID list storing unit 440 of the ECU 400a stores. The example in FIG. 10 indicates the ECU 400a receiving an update message for updating a shared key to which message ID "0x102" has been attached, an update message for updating firmware to which message ID "0x203" has been attached, and so forth. Although the message IDs of the messages (frames) that the ECU 400a receives is not restricted to "0x102" and "0x203", the example in FIG. 10 illustrates that the message IDs of update messages are particularly noteworthy.

Also note that the reception ID list that the reception ID list storing unit 140 of the master ECU 100 stores also is configured as a list of message IDs that the master ECU 100 is capable of receiving, in the same way as the receipt ID list 900.

1.11 Shared Key Update Sequence

Figure 11:
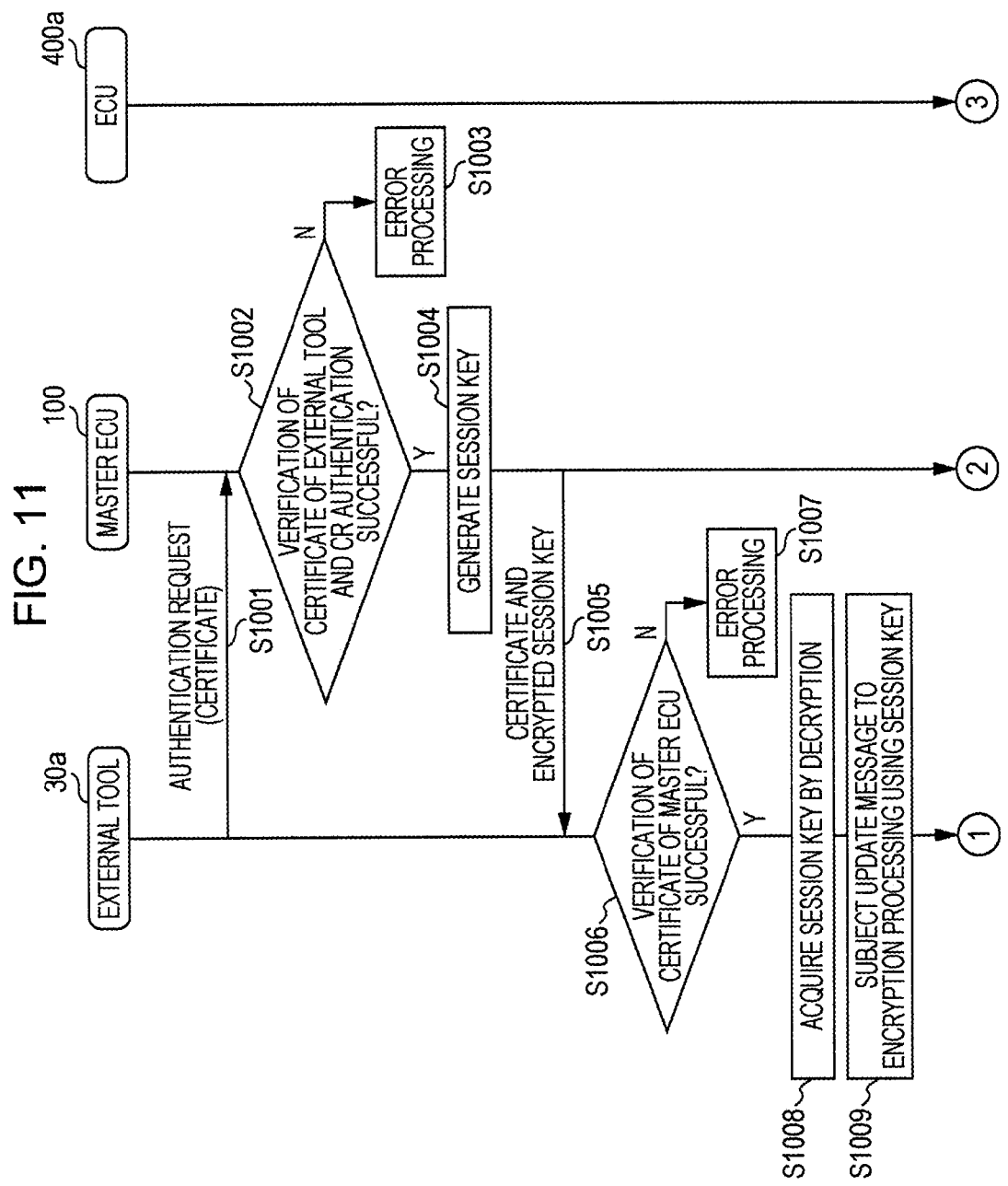
FIG. 11 is a diagram illustrating a shared key update sequence according to the first embodiment (continuing to FIG. 12)
Figure 12:
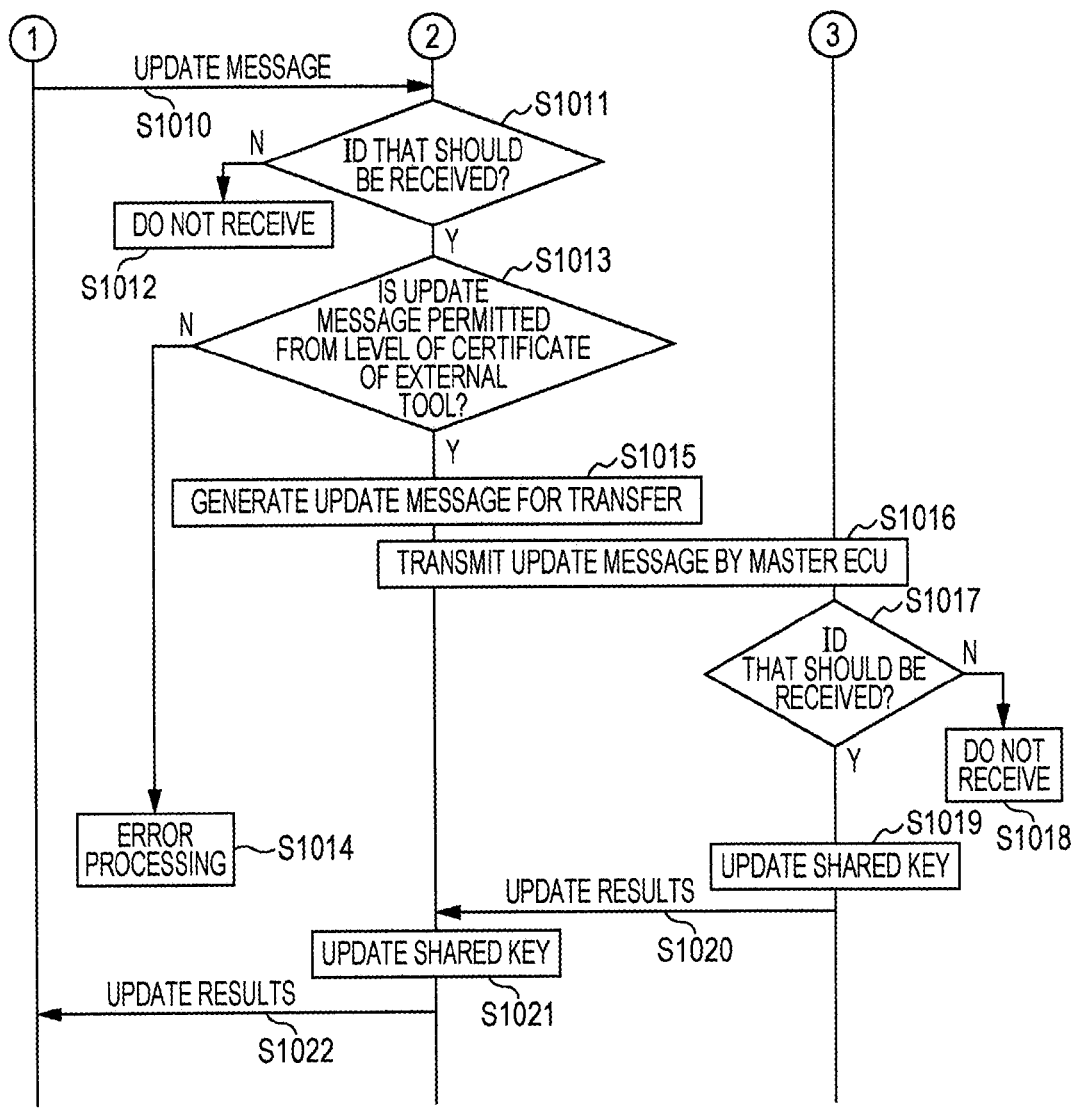
FIG. 12 is a diagram illustrating a shared key update sequence according to the first embodiment (continuing from FIG. 11)

Operations of connecting the external tool 30a to the diagnostic port 600 and causing the external tool 30a to update the shared keys that the ECUs of the onboard network system 10 store (shared key update sequence) will be described below with reference to FIGS. 11 and 12, which are diagrams illustrating an example of a shared key update sequence performed between the external tool 30a, the master ECU 100, and the ECU 400a. Description will be made here with focus on the external tool 30a that is one external tool 30, and the ECU 400a that is one of the ECUs 400a through 400f, for sake of convenience. Description will be made further assuming a scene where the external tool 30a is used to update the shared keys that the ECUs having the drive-related functions and chassis-related functions store. Specifically, this means that an update message, to which the message ID "0x102" has been attached for updating of the shared key 60d stored by the ECU 400a having drive-related functions and the ECU 400b having chassis-related functions, has been transmitted from the external tool 30a to the onboard network system 10. Operations of the ECU 400b are the same as the operations of the ECU 400a, so description will be omitted here.

First, in a state where the external tool 30a is physically connected to the diagnostic port 600 that is connected to the master ECU 100 by the bus 500d, the external tool 30a sends a certificate (i.e., the public key certificate 40a that the external tool 30a stores) onto the bus 500d, thereby transmitting an authentication request for communication connection to the ECU 100 (step S1001). Note that the external tool 30a may transmit an update message for updating data (shared keys, firmware) within the ECUs of the onboard network system 10 in accordance with user operations or the like, for example. Still, an authentication request (certificate) needs to be transmitted in accordance with user operations or the like, prior to transmission of the update message, in order to updating to be realized by the update message.

The transmission/reception unit 101 of the master ECU 100 receives the public key certificate 40a, and verifies the public key certificate 40a at the determining unit 103 (step S1002). Verification of the public key certificate 40a is performed by, for example, verifying the signature by the certificate authority, and further confirming whether the external tool 30a stores a secret key corresponding to the public key listed in the public key certificate 40a, by challenge-response (CR) authentication. In CR authentication, the master ECU 100 transmits a random number to the external tool 30a, the external tool 30a returns to the master ECU 100 an encrypted random number that is the result of encrypting the random number by a secret key, and the master ECU 100 decrypts the encrypted random number by the public key within the public key certificate 40a and confirms whether or not this is equal to the initially-transmitted random number, for example. In a case where verification in step S1002 fails, the master ECU 100 performs error processing (step S1003). Due to the error processing in step S1003, communication connection from the external tool 30a becomes impermissible, and the external tool 30a cannot transmit an update message to update data of the ECUs, for example. The master ECU 100 may or may not return a response to the external tool 30a to the effect that there has been an error, as error processing.

If the verification in step S1002 is successful, the master ECU 100 generates a session key to be used for performing encryption processing in the communication with the external tool 30a, using a random number (step S1004). For example, in a case of encrypting data within the update message, the session key is used as a key for encryption, and in a case of adding a MAC to the data within the update message, the session key is used as a key to generate a MAC.

Following step S1004, the transmission/reception unit 101 of the master ECU 100 encrypts the session key using the public key of the external tool 30a, and transmits the encrypted session key that is the result of the encryption, and the public key certificate 40c of the master ECU 100, to the external tool 30a (step S1005).

The external tool 30a performs verification of the public key certificate 40c of the master ECU 100 (step S1006). If the verification fails, error processing is performed (step S1007). If the verification is successful, the external tool 30a decrypts the encrypted session key received by transmission from the master ECU 100 in step S1004 using the secret key stored at the external tool 30a, and acquires the session key (step S1008).

Following step S1008, the external tool 30a generates an update message for updating the shared key 60d with the message ID "0x102" attached, and performs encryption processing of the update message using the session key (step S1009). An example of encryption processing of the update message is, for example, to store in the data field data necessary for updating the shared key 60d for example (e.g., in a case of performing updating at the ECU 400a by a keyed hash function or the like, data serving as the key), and encrypting that data or adding a MAC to that data. A MAC corresponding to all or part of the update message, for example, may be stored in the data field even if data is not necessary for updating of the shared key 60d. For example, predetermined encryption processing to be performed (i.e., predetermined encryption processing using a session key) is stipulated beforehand, regarding sort of processing to perform as encryption processing corresponding to an update message in the onboard network system 10. Each ECU performs updating in accordance with update messages that have been appropriately (i.e., so that verification using a session key will be successful) subjected to predetermined encryption processing (e.g., addition of a MAC), following the stipulations. If the predetermined encryption processing has not been appropriately performed, updating is inhibited regarding that update message.

The external tool 30a transmits the update message generated in step S1009 to the master ECU 100 (step S1010).

The determining unit 103 distinguishes whether or not the message ID of the message (frame) that the transmission/reception unit 101 of the master ECU 100 has received in step S1010 due to transmission by the external tool 30a is an ID that should be received, using the reception ID judging unit 130 (step S1011). The message IDs "0x100" through "0x104" for shared key updating, and the message IDs "0x200" through "0x206" for firmware updating, are distinguished to be IDs that should be received. Although messages (frames) from the external tool 30a are called update messages since description is being made assuming a case where the external tool 30a transmits update messages, there can be cases where these actually are not update messages, so distinguishing is performed in step S1011. That is to say, in a case where a message (frame) transmitted from the external tool 30a is found to actually be an update message, distinguishing is made that it should be received. For the sake of convenience of description, an arrangement is made here that the master ECU 100 does not handle message IDs of messages other than update messages from an external tool 30 (e.g., external tool 30a or the like) connected to the diagnostic port 600 as IDs to be received.

In a case where determination is made in step S1011 that the message ID of the message that the transmission/reception unit 101 has received is not an ID to be received, the determining unit 103 of the master ECU 100 cancels processing relating to the message of that message ID, and the transmission/reception unit 101 ends the processing without receiving the content following the ID field (data field and so forth) (step S1012).

In a case where determination is made in step S1011 that the message ID of the message that the transmission/reception unit 101 has received is an ID to be received, the determining unit 103 of the master ECU 100 determines whether or not the received message is a permissible update message, according to whether or not the message ID "0x102" of the received message and the level of the update authority information listed in the public key certificate 40a of the external tool 30a match the correlation of the message ID 1041 and level 1042 in the level information 1040 stored in the level information storing unit 104 (step S1013). That is to say, the determining unit 103 determines whether or not the update authority information indicates that the update message transmission by the external tool 30a is within the range of authority of the external tool 30a, based on the level information 1040. In a case where the received message is not a permissible update message, error processing is performed (step S1014). Error processing in step S1014 inhibits updating corresponding to the update message. Assuming that the level of the update authority information of the public key certificate 40a is 3 here (see FIG. 3), the correlation with the update message having the message ID "0x102" matches the correlation indicated by the level information 1040 (see FIG. 8), so the determining unit 103 determines that the update message received from the external tool 30a is a permissible update message.

In a case where determination is made in step S1013 that the transmission of the received message is within the range of authority of the external tool 30a (i.e., in a case where determination is made that the received message is a permissible update message), the determining unit 103 instructs the frame generating unit 120 to generate an update message for transfer (step S1015). Accordingly, the frame generating unit 120 generates a new update message (frame) for transfer to the bus 500b (i.e., for transfer to another ECU), based on the original update message that the master ECU 100 has received from the external tool 30a. For example, in a case where a session key that the master ECU 100 uses for communication with the external tool 30a and a session key that used for communication with other ECUs (at least the ECUs connected to the bus 500b) are different, the frame generating unit 120 uses the session key for communication with the external tool 30a for decryption if the encryption processing that the original update message has been subjected to is encryption, and subjects the results of the processing to encryption using a session key used for communication with the other ECUs, thereby generating a new update message. If the encryption processing that the original update message has been subjected to is addition of a MAC, the frame generating unit 120 generates a MAC using the session key used for communication with the other ECUs and replaces the MAC of the original update message with the generated MAC, thereby generating a new update message. In this case, error processing may be performed of verification of the MAC of the original update message is performed and verification fails. Also, in a case where the session key that the master ECU 100 uses for communication with the external tool 30*a* and the session key used for communication with other ECUs is the same, the frame generating unit 120 generates a new update message that is the same as the original update message.

Following step S1015, the frame transmission/reception unit 160 sends the update message generated by the frame generating unit 120 of the master ECU 100 out onto the bus 500*b* (step S1016). That is to say, in a case where an update message has been transmitted from the external tool 30*a*, the update message is transferred to the bus 500*b* if verification of the update authority information (i.e., verification of the public key certificate) has been successful and also the update authority information indicates that transmission of the update message is within the range of authority of the external tool 30*a*. Note that if verification of the update authority information has field, or the update authority information does not indicate that transmission of the update message is within the range of authority of the external tool 30*a*, the update message is not transferred to the bus 500*b*.

The update message sent out onto the bus 500*b* by the master ECU 100 is transferred to the bus 500*a* and bus 500*c* by the gateway 300. Accordingly, the ECUs 400*a* through 400*f* can receive the update message. Thus, when the master ECU 100 determines that the update authority information indicates that the transmission of the update message of a certain message ID is within the range of authority of the external tool 30*a*, updating in accordance with the update message can be executed by the ECUs predetermined to receive the update message of that message ID.

At the ECU 400*a* (see FIG. 9), the update message is received by the frame transmission/reception unit 460, and the frame interpreting unit 450 interprets the content of that message, and inquires of the reception ID judging unit 430 whether or not the ID should be received. The reception ID judging unit 430 references the reception ID list that the reception ID list storing unit 440 stores, and judges whether or not the value of the ID field of the received message is an ID that should be received (step S1017). In a case where the reception ID judging unit 430 determines in step S1017 that the message ID of the message received by the frame transmission/reception unit 460 is not an ID to be received, the frame interpreting unit 450 cancels processing relating to the received message, and the frame transmission/reception unit 460 ends processing without receiving the content after the ID field (step S1018).

In a case where the reception ID judging unit 430 judges in step S1017 that the Id field value of the message received by the frame transmission/reception unit 460 is an ID to be received, the ECU 400*a* executes processing corresponding to the message (i.e., the update message) thereof (i.e., updating of the shared key 60*d*) (step S1019). The frame processing unit 410 generates a new post-updating shared key 60*d* from the shared key 60*d* stored in the key storing unit 402, by a keyed hash function using the key data within the data field of the update message. Updating does not necessarily have to use a keyed hash function, other examples include updating the original shared key to a new shared key using an unkeyed hash function (one-directional function). Note that processing (decryption or MAC verification) corresponding to encryption processing (encryption or MAC addition) that the update message has been subjected to is performed at the ECU 400*a* using a session key, thereby acquiring key data of the update message.

The ECU 400*a* sends the message indicating the update results (also referred to as update results message) on to the bus 500*a* after updating of the shared key 60*d*, so as to be transmitted to the master ECU 100 (S1020). The message ID of the updating results message is predetermined, the master ECU 100 storing the message ID of the updating results message in the list in the reception ID list storing unit 140. The updating results message indicates to the effect that updating has been completed (i.e., to the effect that updating has been successful), for example. In a case where an error has occurred during updating (e.g., a case where MAC verification of key data has failed, or the like) the updating results message may indicate to the effect that updating has failed. The updating results message is transferred from the bus 500*a* to the bus 500*b* by the gateway 300.

Upon receiving the updating results message, the master ECU 100 updates the shared key 60*d* (see FIG. 6) that the key storing unit 102 stores by the same method as the ECU 400*a* (step S1021). An arrangement may be made where the shared key 60*d* that the key storing unit 102 stores is updated only in a case where both the updating results message from the ECU 400*a* to the effect that the updating has been successful, and the updating results message from the ECU 400*b* to the effect that the updating has been successful, are received.

The master ECU 100 transmits the updating results message received in step S1020 to the external tool 30*a* via the diagnostic port 600, by sending out onto the bus 500*d* (step S1022). Accordingly, the external tool 30*a* can receive the updating results message and know that the intended updating has been completed on the onboard network system 10, and notify (display or the like in a case where the external tool 30*a* has a display device, for example) the user of completion of updating, for example.

Although description has been made above regarding an example where the external tool 30*a* transmits an update message for updating the shared key 60*d* that each of the ECU 400*a*, ECU 400*b*, and master ECU 100 store, the devices perform the same operations in a case of transmitting an update message for updating a shared key that other ECUs stored, or transmitting an update message for updating firmware within the ECUs. The external tool 30*a* may, after having transmitting an authentication request once, successively transmit the update messages. In this case, after the processing from step S1001 through step S1008 is executed once, the processing of step S1009 and thereafter is repeated each time the external tool 30*a* transmits the update messages. An update message for updating firmware within the ECUs includes information for identifying the content of the firmware after updating, for example, and the ECUs that are the object of the update message rewrite the firmware based on the information for identifying the content of the firmware after updating. The firmware includes, for example, software such as programs within the ECUs, and data used by the programs, and may include microcode at processors within the ECUs. In a case where an ECU includes an FPGA (Field Programmable Gate Array) or the like for example, the firmware may include circuit configuration data. Further, although shared keys and firmware have been handled separately here for the sake of description, firmware may be handled as including shared keys.

1.12 Advantages of First Embodiment

In the onboard network system 10 according to the first embodiment, whether or not an external tool 30 connected to the diagnostic port 600 has transmission authority for an update message to update data within certain ECUs, that is to say whether or not the external tool 30 has authority to update data within certain ECUs, is determined based on levels set corresponding to function types of ECUs, indicated by update authority information indicating the authority that the external tool 30 has been certified for. Accordingly, updating of the shared keys or firmware within ECUs by an unauthorized external tool can be prevented. Also, the level of update authority information can be set (and certified) differently for each external tool, in accordance with, for example, the secrecy and reliability of the external tool, the reliability of the business handling the external tool, and various other circumstances. This enables external tools with different levels to be distributed to individual maintenance businesses and so forth, enabling operations where updating authority is flexibly restricted in accordance with various circumstances. For example, the more sufficient that security such as secrecy, reliability, and so forth, secured for the external tool is, the higher authority level can be certified, and so forth. Enabling the level of the update authority information to be set for each external tool in this way is useful in flexibly designing and manufacturing external tools according to usage in an efficient manner, and in flexibly securing security for operating the external tool according to usage.

Second Embodiment

An onboard network system 10a that is a partial modification of the onboard network system 10 described in the first embodiment will be described as a second embodiment. In the onboard network system 10 according to the first embodiment, in a case where an external tool 30 is connected to the diagnostic port 600, the master ECU 100 authenticates the external tool 30, and only in a case where an update message from the external tool 30 is within the range of authority (level) that update authority information indicates is the external tool 30 permitted to update data within ECUs by that update message.

In the onboard network system 10a according to the present embodiment, not only the level but also the state of the vehicle in which the onboard network system 10a is installed, and the remaining battery charge of the vehicle, are referenced in determination of whether or not to permit an update message of the external tool 30. The configuration of the onboard network system 10a according to the present embodiment is generally the same as the onboard network system 10 illustrated in the first embodiment (see FIG. 1), and hereafter, the same items are denoted by the same reference numerals.

2.1 Overall Configuration of Onboard Network System 10a

Figure 13:
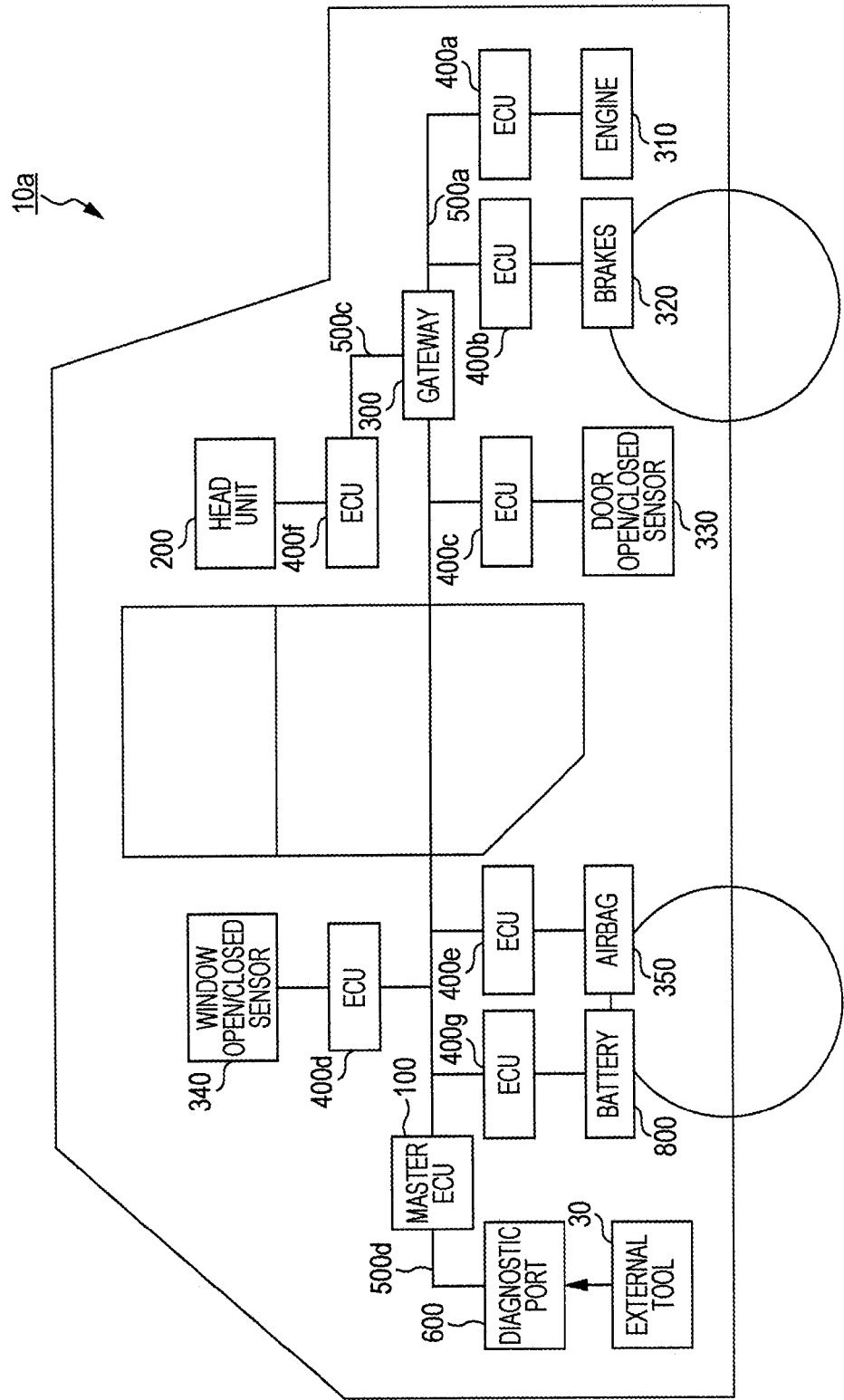
FIG. 13 is an overall configuration diagram of an onboard network system according to a second embodiment.

FIG. 13 is a diagram illustrating the overall configuration of the onboard network system 10a according to the second embodiment. FIG. 13 illustrates an external tool 30 besides the onboard network system 10a. In the onboard network system 10a, a battery 800 and an ECU 400g have been added to the onboard network system 10 (FIG. 1). Description of components that are the same as the first embodiment will be omitted here.

The ECU 400g is connected to the bus 500b, and performs control relating to charge/discharge of the battery 800, manages acquisition of remaining charge of the battery 800, and periodically transmits frames representing the state of remaining charge to the network (i.e., bus 500b). The battery 800 supplies electric power to the ECUs in the onboard network system 10.

2.2 Level Information

FIG. 14 is a diagram illustrating an example of level information 2040 that the level information storing unit 104 of the master ECU 100 according to the second embodiment stores. The level information 2040 is information correlating message ID 2014, level 2042, remaining-charge conditions 2043, and vehicle state conditions 2044, and is used in determining at the determining unit 103 whether or not to permit the update message from the external tool 30. The message ID 2041 and level 2042 are the same as the message ID 1041 and level 1042 illustrated in the first embodiment. The remaining-charge conditions 2043 indicate conditions of remaining battery charge necessary to permit the update message. For example, this is set to a sufficient amount where the remaining charge of the battery is enough for updating, a specific example being setting one of remaining charge of 50% or more and remaining charge of 80% or more as to a full charge of 100%. Also, the vehicle state conditions 2044 indicate conditions for the vehicle state necessary to permit the update message, with one of a stopped state (a state where vehicular speed is zero) and an engine off state (state where the engine 310 is stopped) being selected, for example.

For example, the update message for updating shared keys that has message ID "0x104" indicates being permissible when the level of update authority information is 1 or higher, the remaining charge of the battery 800 is 50% or more, and the vehicle state is a stopped state. Also, the update message for updating firmware that has message ID "0x201" indicates being permissible when the level of update authority information is 4, the remaining charge of the battery 800 is 80% or more, and the vehicle state is an engine off state.

2.3 Shared Key Update Sequence

Figure 15:
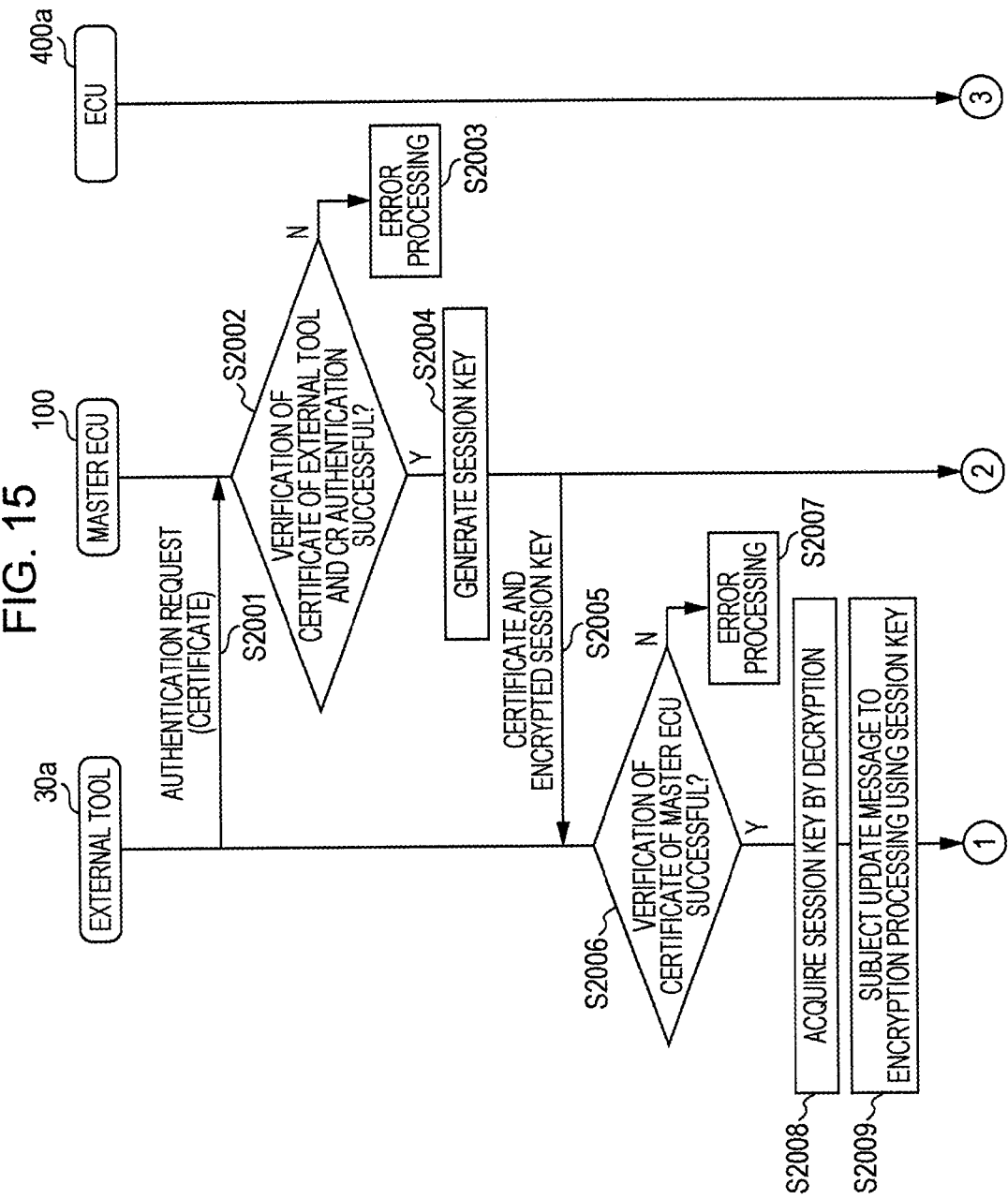
FIG. 15 is a diagram illustrating a shared key update sequence according to the second embodiment (continuing to FIG. 16)
Figure 16:
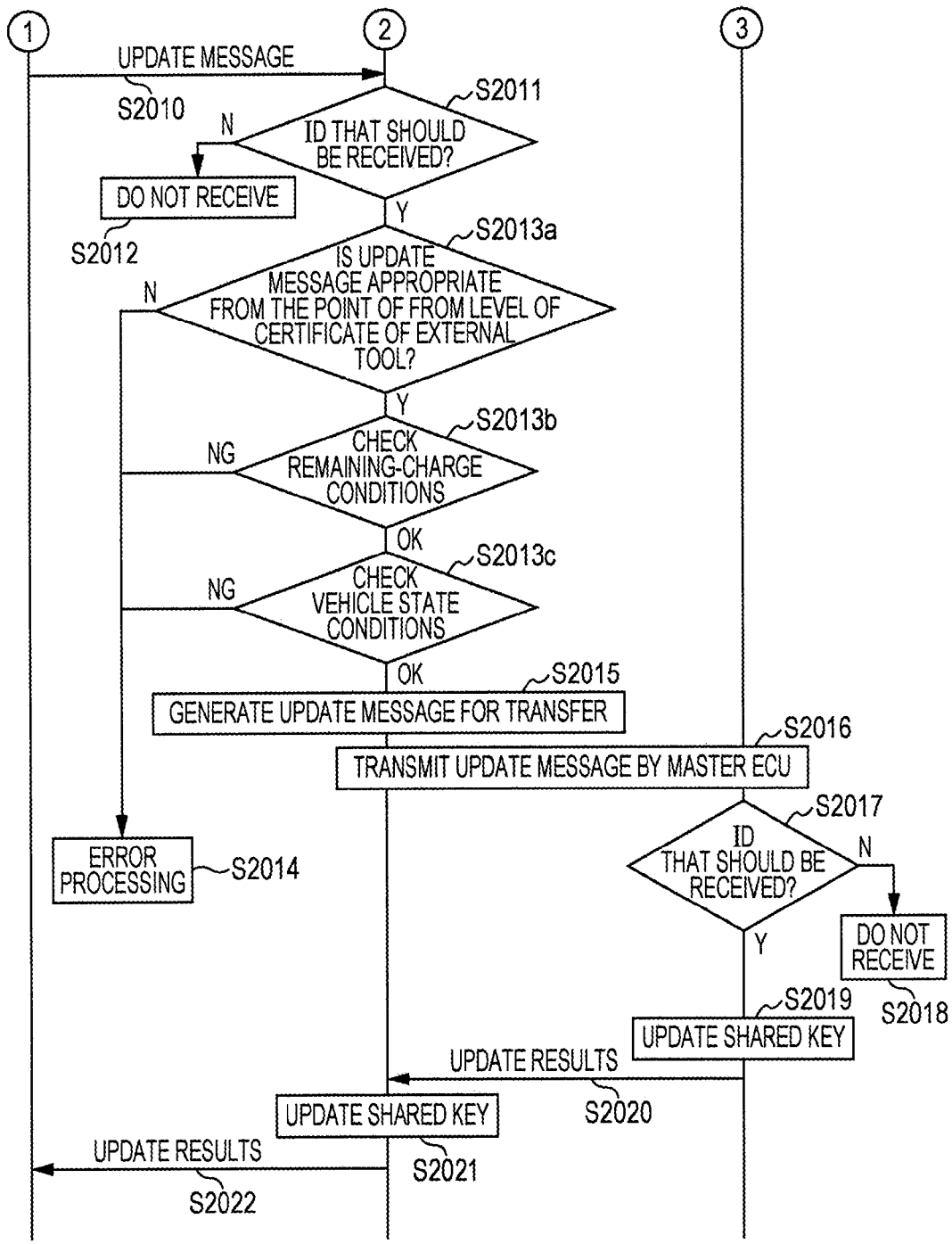
FIG. 16 is a diagram illustrating a shared key update sequence according to the second embodiment (continuing from FIG. 15)

The following is a description of operations of connecting the external tool 30a to the diagnostic port 600 and causing the external tool 30a to update shared keys that the ECUs in the onboard network system 10a store (shared key update sequence) as an example of an update management method, with reference to FIGS. 15 and 16, which are diagrams illustrating an example of a shared key update sequence performed between the external tool 30a, master ECU 100, and ECU 400a. Description will be made here with focus on the external tool 30a that is one external tool 30, and the ECU 400a that is one of the ECUs 400a through 400g, for sake of convenience. Description will be made further assuming a scene where the external tool 30a is used to update the shared keys that the ECUs having the drive-related functions and chassis-related functions store. Specifically, this means that an update message, to which the message ID "0x102" has been attached for updating of the shared key 60d stored by the ECU 400a having drive-related functions and the ECU 400b having chassis-related functions, has been transmitted from the external tool 30a to the onboard network system 10. Operations of the ECU 400b are the same as the operations of the ECU 400a, so description will be omitted here. Also, the processing of step S2001 through step S2012 and step S2014 through step S2022 is equivalent to the processing of step S1001 through step S1012 and step S1014 through step S1022 illustrated in the first embodiment (see FIGS. 11 and 12), so description thereof will be omitted, and only steps S2013a through S2013c, which are difference from the first embodiment, will be described here.

In step S2013a, the determining unit 103 of the master ECU 100 determines whether or not the received message satisfies the conditions regarding authority level as an appropriate update message, by whether or not the message ID "0x102" of the received message and the level of the update authority information described in the public key certificate 40a match the correlation of the message ID 2041 and level 2042 in the level information 2040 stored in the level information storing unit 104, based on the level information 2040. That is to say, the determining unit 103 determines whether or not the update authority information indicates that the transmission of the update message by the external tool 30*a* is within the range of authority of the external tool 30*a*. In a case where the received message does not satisfy this condition regarding level of authority, error processing is performed (step S2014). Assuming that the level of update authority information of the public key certificate 40*a* is 3 here (see FIG. 3), the correlation with the update message of message ID "0x102" matches the correlation indicated in the level information 2040 (see FIG. 14), so the determining unit 103 determines that the update message received from the external tool 30*a* is an appropriate update message from the point of level, and the processing transitions to the next step S2013*b*.

The determining unit 103 checks whether the remaining charge of the battery 800 satisfies the conditions in step S2013*b*. In a case where the ECU 400*g* that manages the remaining charge of the battery 800 periodically transmits a message indicating the remaining charge (referred to as remaining-charge frame), the master ECU 100 receives the remaining-charge frame from the ECU 400*g* using the frame transmission/reception unit 160. Note that the reception ID list that the reception ID list storing unit 140 of the master ECU 100 stores includes the message ID of the remaining-charge frame from the ECU 400*g*. The determining unit 103 checks whether or not the remaining charge that the remaining-charge frame received from the ECU 400*g* indicates satisfies remaining-charge conditions 2043 corresponding to the message ID 2041 stored in the level information storing unit 104. If the remaining-charge conditions are satisfied, the processing transitions to the next step S2013*c*. In a case where the remaining-charge conditions are not satisfied (i.e., the results of the check are not OK), error processing is performed (step S2014). An arrangement may be made where the ECU 400*g* does not periodically transmit remaining-charge frames indicating the remaining-charge state, and in this case, the master ECU 100 may transmit a frame to the ECU 400*g* commissioning transmission of a remaining-charge frame, for example, thereby receiving the remaining-charge frame from the ECU 400*g*, and acquiring the remaining-charge state at the time that the update message is received (i.e., at the present).

In step S2013*c*, the determining unit 103 determines whether or not the vehicle state satisfies conditions. In a case where the ECU 400*a* relating to the engine 310 periodically transmits a message indicating vehicle state information such as engine state and vehicular speed (referred to as vehicle state frame), the master ECU 100 receives the vehicle state frame from the ECU 400*a* using the frame transmission/reception unit 160. Note that the reception ID list that the reception ID list storing unit 140 of the master ECU 100 stores includes the message ID of the vehicle state frame from the ECU 400*a*. The determining unit 103 checks whether or not the vehicle state such as engine state, vehicular speed, and so forth, that the vehicle state frame received from the ECU 400*a* indicates satisfies vehicle state conditions 2044 corresponding to the message ID 2041 stored in the level information storing unit 104. If the vehicle state conditions are satisfied, the determining unit 103 determines that the update message received from the external tool 30*a* is to be permitted, and the processing transitions to step S2015. In a case where the vehicle state conditions are not satisfied (i.e., the results of the check are not OK), error processing is performed (step S2014). An arrangement may be made where the ECU 400*a* does not periodically transmit vehicle state frames indicating the vehicle state, and in this case, in step S2013*c* the master ECU 100 may transmit a frame to the ECU 400*a* commissioning transmission of a vehicle state frame, for example, thereby receiving the vehicle state frame from the ECU 400*a*, and acquiring the vehicle state at the time that the update message is received (i.e., at the present).

2.4 Advantages of Second Embodiment

The onboard network system 10*a* according to the second embodiment determines whether or not to permit processing (updating) relating to an update message from the external tool 30, in accordance with not only authority level but also the remaining-charge state and vehicle state when the update message was transmitted. Accordingly, the following advantages are obtained in addition to the advantages of the onboard network system 10 according to the first embodiment. That is to say, updating of data within the ECUs (shared keys or firmware) can be completed in a sure manner, without the updating processing being interrupted, by confirming the remaining charge. Also, confirming the vehicle state enables a situation to be avoided in which an update message is transmitted at a time when the load of the ECUs is great and bus traffic is increased, such as while the vehicle is being driven, or the like, thereby improving the probability that updating will be successful.

Third Embodiment

An example will be described in the a third embodiment where the master ECU 100 in the onboard network system 10 according to the first embodiment is partially modified, to where notification can be made regarding the expiration date of shared keys.

3.1 Configuration of Master ECU (Update Management Device) 100*a*

Figure 17:
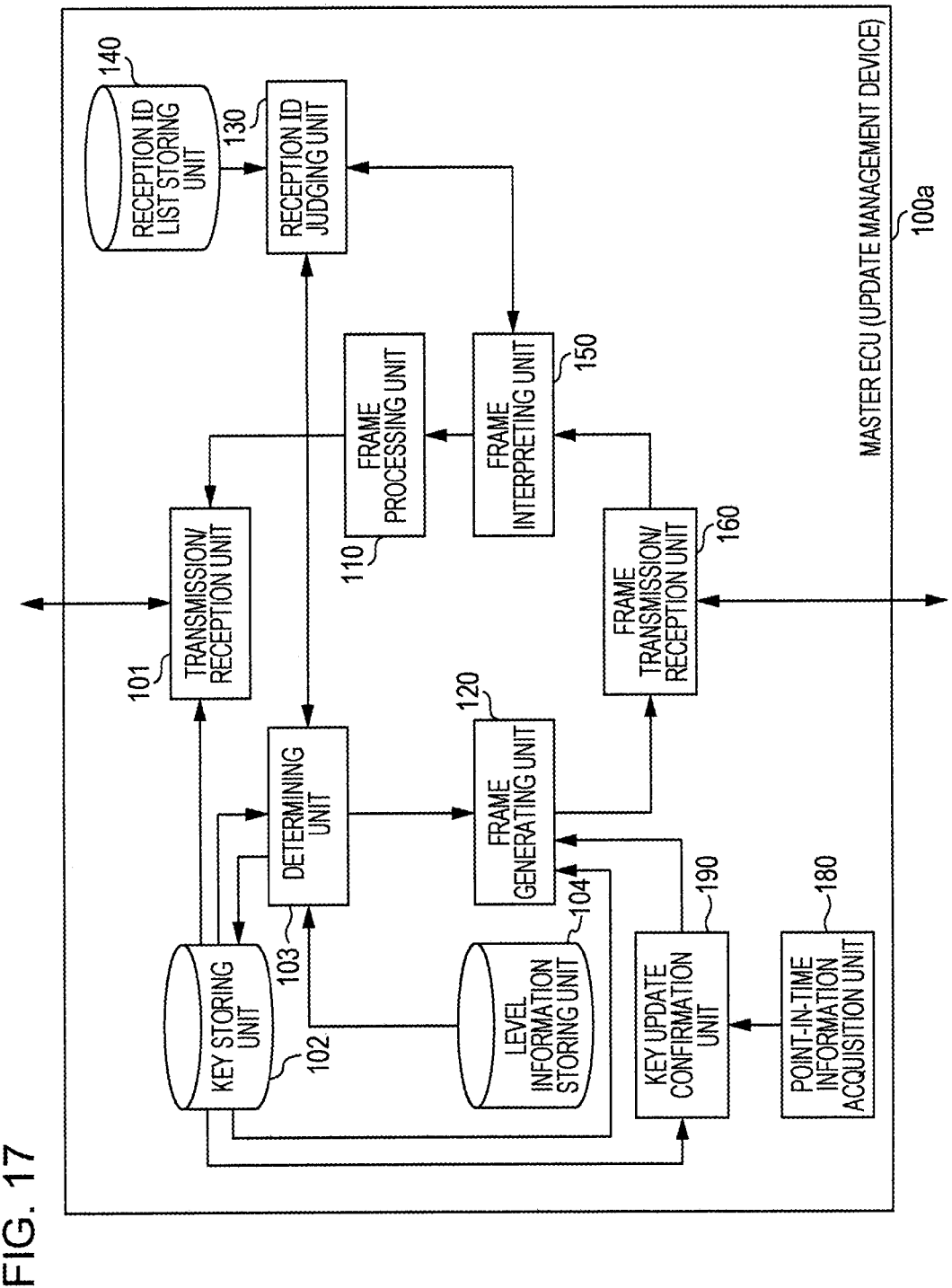
FIG. 17 is a configuration diagram of a master ECU (update management device) according to a third embodiment.

FIG. 17 is a configuration diagram of a master ECU 100*a*. The master ECU 100*a* has a configuration where a point-in-time information acquisition unit 180 and key update confirmation unit 190 have been added to the components of the master ECU 100 illustrated in the first embodiment, to check the expiration date of shared keys. These components are functional components, and the functions thereof are realized by a communication circuit of the master ECU 100*a*, a processor or digital circuit or the like that executes control programs stored in memory, or the like. Description of the components illustrated in the first embodiment will be omitted here.

The point-in-time information acquisition unit 180 is configured as a clocking mechanism, such as a real-time clock for example, that acquires the current point-in-time (i.e., the current date and time) and successively notifies the key update confirmation unit 190.

The key update confirmation unit 190 confirms the current point-in-time notified from the point-in-time information acquisition unit 180 and expiration dates set beforehand regarding shared keys that the key storing unit 102 stores, and at a point when a timing set beforehand as an alert notification timing has passed (i.e., a predetermined period before the expiration date), causes the frame generating unit 120 to generate a key update alert message and transmit from the frame transmission/reception unit 160.

Figures 18, 19:
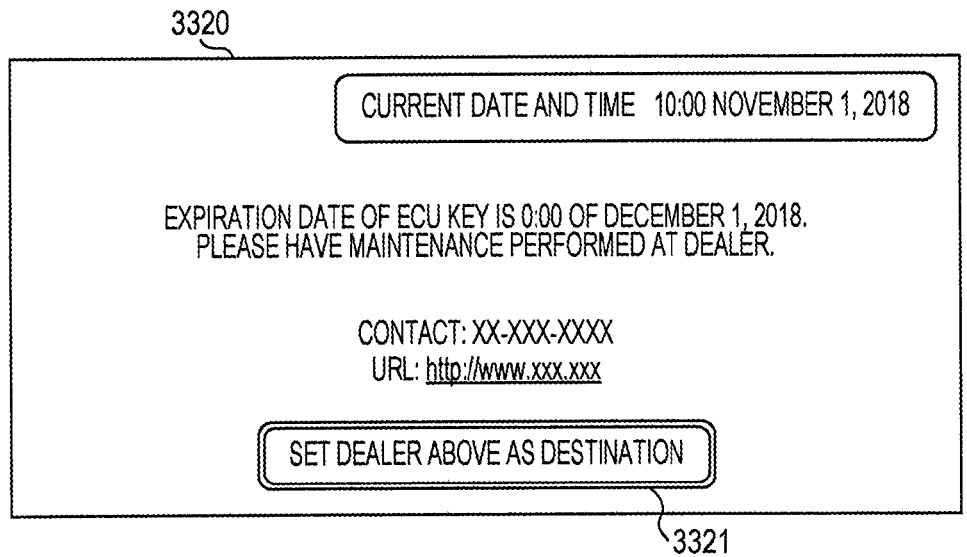
FIG. 18 is a diagram illustrating information correlating shared keys and expiration dates according to the third embodiment.
FIG. 19 is a diagram illustrating an example of a screen prompting shared key updating according to the third embodiment.

FIG. 18 illustrates an example of information, where shared key identification information 3310 and expiration date 3311 and alert notification timing 3312 have been correlated regarding each of the shared keys that the key storing unit 102 stores. The shared key identification information 3310 is information for distinguishing the shared keys. The expiration date 3311 indicates the expiration date that has been set beforehand in order to secure security for the shared key indicated by the corresponding shared key identification information. The alert notification timing 3312 indicates timing at which to prompt key update, prior to the expiration date. The key update confirmation unit 190 references the information illustrated in FIG. 18. For example, a key update alert message is transmitted from three months before the expiration date in the case of the shared key 60*a*, and a key update alert message is transmitted from one month before the expiration date in the case of the shared key 60*d*.

The key update alert messages are received by the ECU 400*f* connected to the head unit 200. Upon receiving a key update alert message, the ECU 400*f* displays warning information (a screen) prompting updating of the shared key, to the effect that the expiration date of the shred key is approaching or the like, on the display device of the head unit 200.

3.2 Key Update Alert Message

FIG. 19 is a diagram illustrating an example of a screen displayed on the display device of the head unit 200 in a case where the expiration data of a shared key is approaching. In the example in FIG. 19, a screen 3320 includes the current date and time, and the expiration data of the shared key of the ECU, and further includes a contact for a maintenance business to update the shared key (a dealer in this case) and a uniform resource locator (URL) for a Web site thereof. The screen 3320 also includes a button 3321 in a graphical user interface (GUI) to transition to a screen for setting the address of the dealer as the destination in a navigation system. Information regarding the dealer may be registered beforehand in the master ECU 100*a* at the point of sale or the like, or may be acquired via an ECU having telematics-related functions.

If the driver who has seen the screen 3320 exemplified in FIG. 19 drives the vehicle to a maintenance business such as a dealer or the like, the dealer or the like can use the external tool 30 to execute updating of shared keys that the ECUs in the onboard network system store, as described in the first and second embodiments and so forth.

3.3 Advantages of Third Embodiment

The onboard network system according to the third embodiment manages expiration dates of shared keys, and in a case where an expiration date is approaching, displays warning information (a screen) prompting the driver of the vehicle to update the keys, on the display device of the head unit. This realizes a reminder to secure security relating to shared keys, such as a warning or the like for maintenance at a dealer or the like.

Fourth Embodiment

In a fourth embodiment, an example will be described where the master ECU 100 in the onboard network system 10 according to the first embodiment has been modified to attach vehicle identification information to update result messages and transmit to the external tool 30, and the external tool 30 communicates with a server 35.

4.1 Server

The server 35 that communicates with the external tool 30 is a computer that exists outside of the vehicle to which the onboard network system 10 is installed. Assuming an arrangement where multiple vehicles each have the onboard network system 10 installed therein, the server 35 manages which vehicle (i.e., which onboard network system) the external tool 30 has performed what sort of updating (update of data within ECUs).

4.2 Shared Key Update Sequence

Figure 20:
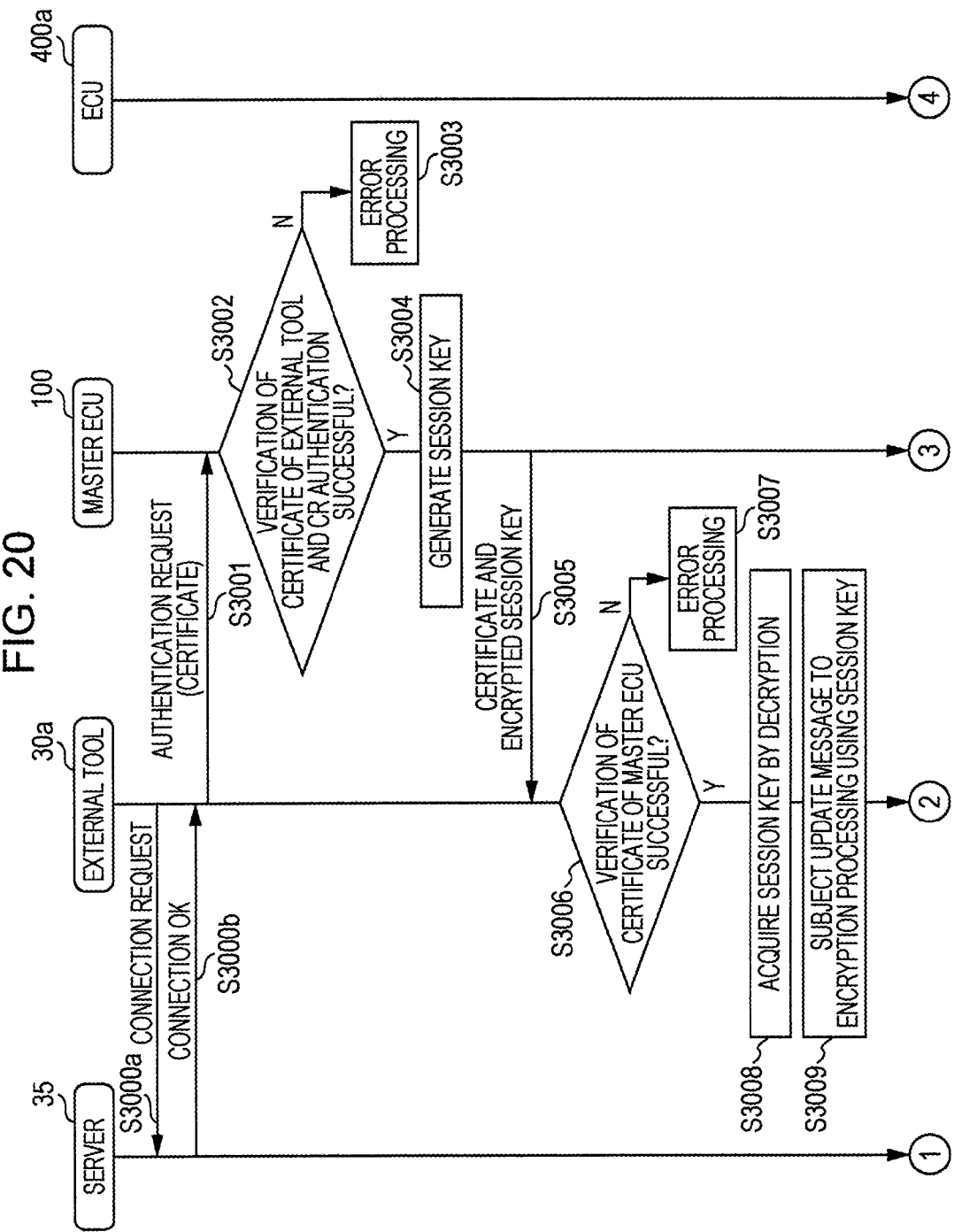
FIG. 20 is a diagram illustrating a shared key update sequence according to a fourth embodiment (continuing to FIG. 21)
Figure 21:
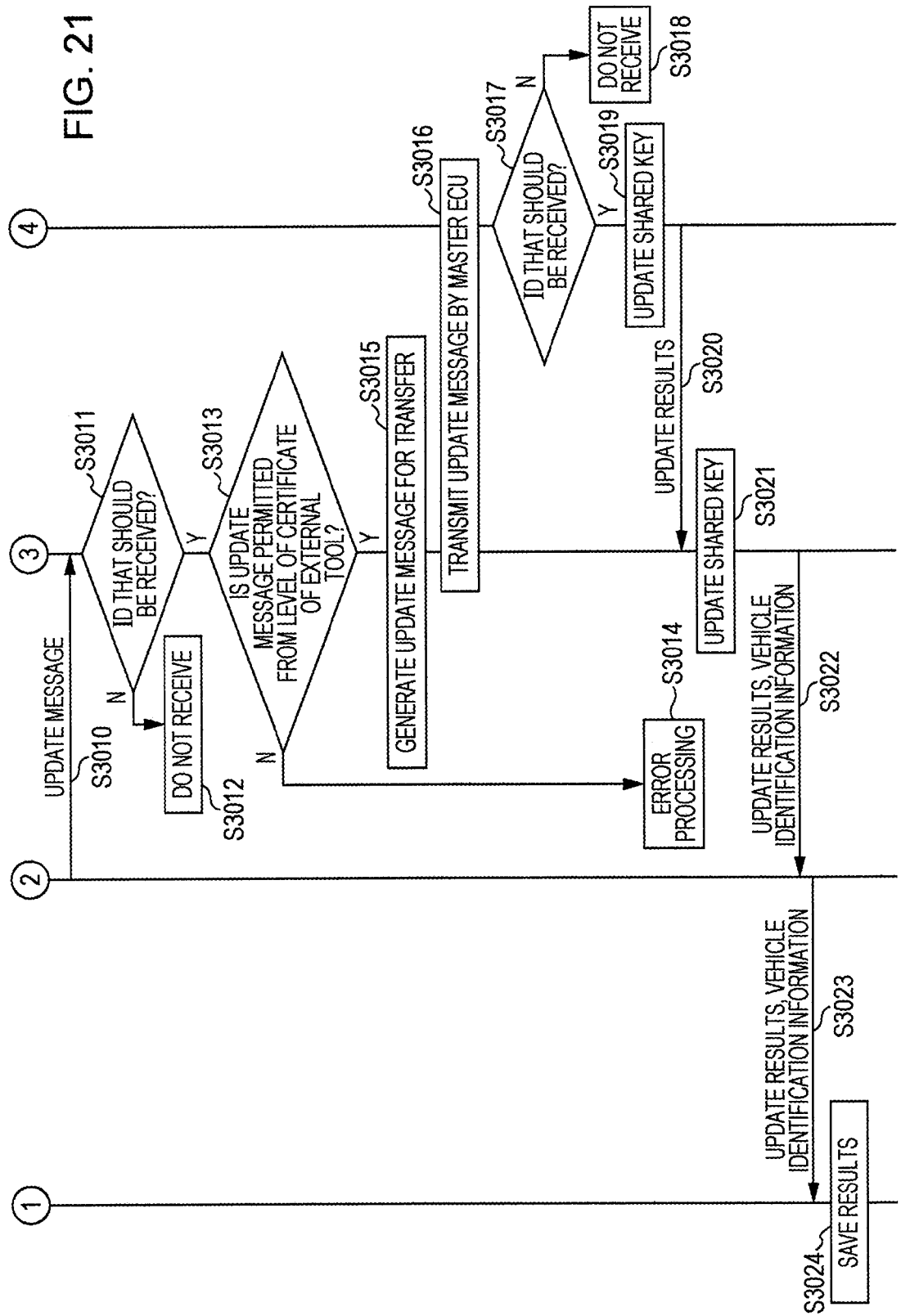
FIG. 21 is a diagram illustrating a shared key update sequence according to the fourth embodiment (continuing from FIG. 20)

The following is a description of operations of connecting the external tool 30*a* that communicates with the server 35 to the diagnostic port 600 and causing the external tool 30*a* to update shared keys that the ECUs in the onboard network system 10*a* store (shared key update sequence) as an example of an update management method, with reference to FIGS. 20 and 21.

FIGS. 20 and 21 are diagrams illustrating an example of a shared key update sequence performed between the external tool 30*a* that communicates with the server 35, master ECU 100, and ECU 400*a*. The processing of step S3001 through step S3021 is equivalent to the processing of step S1001 through step S1021 illustrated in the first embodiment (see FIGS. 11 and 12), so description thereof will be omitted, and only steps S3000*a*, S3000*b*, S3022, S3023, and S3024, which are difference from the first embodiment, will be described here.

In step S3000*a*, the external tool 30*a* issues a connection request to the server 35. That is to say, the external tool 30*a* transmits a login request to the server 35 using a pre-registered ID (e.g., tool ID) and password.

In step S3000*b*, the server 35 receives the connection request from the external tool 30*a*, and if the ID and password match the pre-registered information, login processing is performed and a normal response is returned.

Following step S3000*b*, the external tool 30*a*, master ECU 100, and ECU 400*a* perform the processing relating to updating shared keys in the same way as described in the first embodiment. Accordingly, the master ECU 100 receives an update results message indicating the update results from the ECU 400*a* in step S3020.

In step S3022, the master ECU 100 sends a vehicle-identification-information-attached update results message including, in addition to the update results from the ECU 400*a*, vehicle identification information, out onto the bus 500*b*, thereby transmitting to the external tool 30*a* via the diagnostic port 600. Thus, the external tool 30*a* receives the vehicle-identification-information-attached update results message. It is sufficient for the vehicle identification information to be information for identifying the onboard network system to which the external tool 30*a* is connected out of the multiple onboard network systems, and is the public key certificate 40*c* of the master ECU 100 (see FIG. 3) or the like, for example.

In step S3023, the external tool 30*a* transmits the vehicle identification information and update results indicated by the received vehicle-identification-information-attached update results message to the server 35.

In step S3024, the server 35 saves the received vehicle identification information and update results, the current date and time, and the ID received at the time of login, in a correlated manner as log information 4000.

4.3 Diagnostic Log Information

FIG. 22 is a diagram illustrating an example of log information 4000 that the server 35 saves. The log information 4000 includes vehicle identification information 4001, external tool ID 4002, message ID 4003 of update messages, date and time 4004, and update results 4005.

4.4 Advantages of Fourth Embodiment

In the present embodiment, the server 35 saves the log information 4000, and information is retained regarding which vehicle has been updated by which external tool, so the state of maintenance can be comprehended. Also, in a case where an unauthorized external tool is discovered, the log information 4000 can be used to identify the range affected by that external tool.

Other Embodiments

The first through fourth embodiments have thus been described above as examples of technology relating to the present disclosure. However, technology relating to the present disclosure is not restricted to this, and also is applicable to embodiments where modifications, substitutions, additions, omissions, and so forth have been performed as appropriate. For example, the following modifications are also included in an embodiment of the present disclosure.

(1) Although an example has been illustrated in the above embodiments where the range of sharing of the shared keys is distinguished by function type that classifies functions, this is not restrictive, and increments in which a master ECU and one or multiple other ECUs cross-share shared keys may be optionally set in the onboard network system. For example, the onboard network may be divided into multiple domains, with shared keys being set for each domain. In this case, level information may be set with domains distinguished for the level of authority necessary for updating. Also, although an example has been illustrated in the above embodiments where the external tool 30 has a public key certificate including update authority information in which the authority level has been set taking function type into consideration, the external tool 30 may have a public key certificate in which is set updating authority in accordance with automobile manufacturer or model.

(2) Although an arrangement has been described in the above embodiments where new shared keys are generated in shared key updating from the shared keys the ECUs currently store, using a keyed hash function, the external tool 30 may include new shared keys themselves in update messages and transmit. In this case, the value of a shared key may be divided and transmitted in multiple frames if it does not fit into one CAN frame.

(3) Although an example has been illustrated in the above embodiments where an update message is transmitted from the external tool 30 to update data (shared keys, firmware, etc.) in ECUs, other messages such as for malfunction diagnosis and so forth may also be transmitted. Processing corresponding to messages other than update messages may be performed corresponding to the message without determining authority based on level information in the onboard network system (e.g., the master ECU). Further, determination may be made regarding optional messages including messages for malfunction diagnosis and so forth, whether the transmission of the message on the onboard network system (e.g., master ECU) is within the range of authority permitted to the external tool 30, based on authority information indicating the level of authority.

(4) Although the level of authority is set to be 1 through 4 in the above embodiments, the number of levels does not have to be four stages, and may be more or fewer.

(5) The way of classifying function types illustrated in the above embodiments is only an example, and may be subdivided in further detail, for example. The function types may be classified as fine as possible, with the authority level relating to updating data with ECUs being set for each ECU, for example.

(6) Although an example has been illustrated in the second embodiment where the remaining-charge conditions 2043 are the percentage as to a full charge of the battery 800, this may be distinguished by voltage or the like of the battery 800. Also, conditions may be set that distinguish whether or not the battery 800 is being charged by an external power source that exists outside of the vehicle. Accordingly, updating of certain shared keys and firmware may be permitted only while charging or the like, for example.

(7) Although an example has been illustrated in the third embodiment where, in a case of the expiration date of key updating approaching, information (a screen) is displayed to the effect that the expiration date of the shared key is approaching, based on a key update alert message, this information may be repeatedly or intermittently displayed, and when the expiration date has passed, an alarm may be notified (display or the like).

(8) Although an example has been illustrated in the third embodiment where the point-in-time information acquisition unit 180 of the master ECU 100*a* acquires the current time using a clocking mechanism, to confirm expired shared keys, time information indicating the current point-in-time may be acquired from a Wi-Fi (registered trademark) or cellular phone carrier network, or time information may be acquired from GPS (Global Positioning System) signals. The master ECU 100*a* may acquire time information from another ECU.

(9) The external tool 30 illustrated in the above embodiments may acquire an update message by reception from a server, and transfer to the master ECU via the diagnostic port 600.

(10) Although an arrangement has been described in the above embodiments where authentication is performed between the external tool 30 and the master ECU, an arrangement may be made where the diagnostic port 600 that is a connector or the like compliant with OBD2 is provided with an electronic circuit (e.g., memory, processor, etc.) that handles authentication and so forth, so that the diagnostic port 600 performs authentication of the external tool 30. In this case, if authentication of the external tool 30 is completed by the diagnostic port 600, the master ECU can omit authentication of the external tool 30. Even if authentication of the external tool 30 has been completed by the diagnostic port 600, authentication may be performed between the external tool 30 and the master ECU. Note that the diagnostic port 600 may be realized by another connector, instead of a connector compliant with OBD2 or the like. Also, the diagnostic port 600 may be realized including a wireless communication circuit, thereby enabling wireless connection with the external tool 30.

(11) Although an example has been illustrated in the second embodiment where the master ECU 100 checks the remaining charge and vehicle state upon having received an update message, the check may be just one or the other of the remaining charge and vehicle state. The update authority information may indicate not only the level of authority, but also the conditions regarding update authority, such as the remaining-charge conditions, vehicle state conditions, and so forth, illustrated in the second embodiment. For example, the update authority information may represent that the external tool has authority to cause an ECU to perform updating, where at least condition is that the vehicle state is identified to be a stopped state or engine-stopped state as the vehicle state conditions, and an update message is transmitted when the vehicle is in the identified state. As another example, the update authority information may represent that the external tool has authority to cause an ECU to perform updating, where at least condition is that the remaining charge state of the battery that supplies electric power to the ECUs is identified as the remaining-charge conditions, and an update message is transmitted when the battery is in a state of having the identified remaining charge. The master ECU 100 may perform the check (step S2013*b*, S2013*c*) based on the remaining-charge conditions and vehicle state conditions that the update authority information indicates, instead of the remaining-charge conditions 2043, and vehicle state conditions 2044 in the level information 2040. Accordingly, operation can be performed where external tools are certified for authority with certain conditions, in accordance with the reliability and so forth of the external tool, and public key certificates describing update authority information indicating the conditions and level of authority can be issued.

(12) Although the data frames in the CAN protocol are described in a standard ID format in the CAN protocol, this may be the extended ID format. In a case of the extended ID format, the base ID at the ID position in the standard ID format, and the extended ID together represent a message ID by 29 bits.

(13) Although an example has been illustrated in the above embodiments where no other ECU is connected to the bus 500*d* that connects the diagnostic port 600 where the external tool 30 is connected and the master ECU, an ECU may be connected thereto. Note however, that the data (shared key, firmware, etc.) of an ECU connected to the bus 500*d* other than the master ECU can be updated by update messages that the external tool 30 (e.g., an external tool 30 that has succeeded in authentication with the master ECU and acquired a session key) transmits. Accordingly, it is useful to only connect ECUs having the function types corresponding to the lowest level of the update authority level, for example, to the bus 500*d*.

(14) An arrangement has been described in the above embodiments where, in a case that the external tool 30 has transmitted an update message instructing updating to an ECU exceeding the level of authority permitted thereto, determination is made regarding whether or not the update message is a permitted update message (step S1013), and in a case where the update message is not a permitted update message (step S1014), updating corresponding to the update message is inhibited. However, an arrangement may be made where an ECU other than the master ECU (e.g., an ECU that is the object of update instruction by the update message) switches whether to execute or inhibit the updating, based on update authority information of the external tool 30. That is to say, in a case where an update message is transmitted from the external tool 30 to one of the ECUs in the onboard network system, and verification of the update authority information is successful and further the update authority information indicates that transmission of the update message is within the range of authority of the external tool 30, one or multiple ECUs may execute updating corresponding to the update message, while in a case where verification of the update authority information fails, or the update authority information does not indicate that transmission of the update message is within the range of authority of the external tool 30, updating of one or multiple ECUs corresponding to the update message may be inhibited. A system where the master ECU centrally switches whether or not to transfer update messages, as described in the embodiments, is efficient and useful. An arrangement may also be made where the gateway 300 manages function types of ECUs connected to a bus at a transfer destination, or message IDs that those ECUs can receive, and in a case where an update message is received, the gateway 300 prevents unnecessary update messages from being transferred, based on the function types of the ECUs connected to the bus at the transfer destination and message IDs that those ECUs can receive.

(15) The functional configuration of the master ECUs 100 and 100*a*, the ECU 400*a*, and so forth, illustrated in the above embodiments, are only exemplary, and function division different from the above-described functional configuration may be made. For example, the master ECUs 100 and 100*a* may include a reception unit equivalent to the receipt functions of the transmission/reception unit 101, a verification unit that handles verification of public key certificates (public key certificates including update authority information) in the determining unit 103, and a transfer unit that performs control relating to transmission of update messages, that is equivalent to a part of the determining unit 103, a part of the frame generating unit 120, and a part of the frame transmission/reception unit 160. In this case, for example, the reception unit handles functions of receiving update authority information indicating the authority of the external tool 30 and update messages indicating updating of data that one or multiple ECUs store, that are transmitted from the external tool 30 connected to the diagnostic port 600 via the diagnostic port 600. The verification unit handles functions of verifying update authority information received by the reception unit. Also, in a case where an update message has been received by the reception unit, verification at the verification unit has been successful, and the update authority information indicates that the transmission of the update message is within the range of authority of the external tool 30, the transfer unit handles functions of transferring the update message to the bus 500*b*, and in a case where verification by the verification unit has failed, or the update authority information does not indicate that the transmission of the update message is within the range of authority of the external tool 30, handles functions of inhibiting transfer. The control program executed by the processors of the master ECUs 100 and 100*a* having processors may be a program to cause the master ECUs 100 and 100*a* to execute the following predetermined update management processing, for example. The predetermined update management processing includes an update authority information reception step, of receiving, from an external tool connected to the diagnostic port, update authority information indicating the authority of the external tool, a verification step of verifying the update authority information received in the update authority information reception step, an update message reception step of receiving an update message that is transmitted from the external tool via the diagnostic port, and a transfer control step of, in a case where the update message has been received in the update message reception step, if the verification in the verification step is successful and the update authority information indicates that the transmission of the update message is within the range of authority of the external tool, transferring the update message to the bus, and if the verification in the verification step fails, or the update authority information does not indicate that the transmission of the update message is within the range of authority of the external tool, inhibiting the transfer.

(16) Although the master ECU and other ECUs in the above embodiments have been described as being devices having digital circuits such as a processor, memory, and so forth, analog circuits, communication circuits, and so forth, for example, the devices may include other hardware components such as a hard disk, display, keyboard, mouse, and so forth. The functions thereof may be realized by dedicated hardware (digital circuits and so forth) instead of realizing the functions by software by a control program stored in memory being executed by the processor.

(17) Part or all of the components of which the devices described in the above embodiments are configured may be configured as one system LSI (Large Scale Integration). A system LSI is a super-multifunctional LSI fabricated with multiple components integrated on a single chip, and specifically is a computer system configured including a microprocessor, ROM, RAM, and so forth. The RAM stores the computer program. The system LSI achieves its functions by the microprocessor operating according to the computer program. The components of which the above-described devices are configured may each be independently formed as a single chip, or part or all may be included in a single chip. While a system LSI has been mentioned, there are different names according to the degree of integration, such as IC, LSI, super LSI, and ultra LSI. The way in which the integrated circuit is formed is not restricted to LSIs, and may be realized by dedicated circuits or general-purpose processors. A FPGA capable of being programmed after manufacturing the LSI, or a reconfigurable processor of which the connections and settings of circuit cells within the LSI can be reconfigured, may be used. Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(18) Part or all of the components of which the above-described devices are configured may be configured as an IC card detachably mountable to each device, or a standalone module. The IC card or the module is a computer system configured including a microprocessor, ROM, RAM, and so forth. The IC card or the module may include the above-described super-multifunctional LSI. The IC card or the module achieves its functions by the microprocessor operating according to the computer program. The IC card or the module preferably is tamper-resistant.

(19) The present disclosure may in one form be the update management method such as the shared key update sequence and so forth described above, may be a computer program which realizes these methods by a computer, or may be digital signals made up of the computer program. The present disclosure may in one form be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the digital signals recorded in these recording mediums. The present disclosure may in one form be an arrangement where the computer program or the digital signals are transmitted over an electric communication line, wireless or cable communication line, a network of which the Internet is representative, data broadcasting, or the like. The present disclosure may in one form be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

(20) Forms realized by optionally combining the components and functions exemplified in the above-described embodiments and the above-described modifications are also included in the scope of the present disclosure.

This present disclosure is applicable to manage update of firmware and so forth of ECUs from an external tool in an onboard network, and reduce the risk of unauthorized rewriting and so forth.

What is claimed is:

1. An update management method, used in an onboard network system configured to connect to an external tool, the onboard network system having a plurality of electronic control units (ECUs) that perform communication via a network, the method comprising:
    storing, by a master electronic control unit (master ECU) that is included in the ECUs, a shared key used in transmission of a first session key for an encryption processing between the master ECU and an electronic control unit (ECU) that is other than the master ECU, and an expiration date of the shared key;
    when the master ECU receives an update message from the external tool instructing updating of the shared key, verifying update authority information indicating authority of the external tool, and determining whether or not a transmission of the update message is within a range of an authority of the external tool;
        (i) when verification of the update authority information is successful, and the transmission of the update message by the external tool is determined to be within the range of the authority of the external tool, transferring the update message to the network;
        (ii) when the verification of the update authority information fails, or the transmission of the update message by the external tool is determined to be outside of the range of authority of the external tool, not transferring the update message to the network;
    acquiring external point-in-time information;
    determining whether or not the external point-in-time information is before the expiration date; and
    when the external point-in-time information is a predetermined amount of time before the expiration date or the expiration date has passed, transmitting an alert message prompting to update the shared key,
    wherein the update authority information (i) identifies that one or more function types are out of a plurality of function types related to operation of a vehicle for classifying the ECUs, and (ii) indicates that the external tool has authority to cause the ECU that is classified to any of the identified one or more function types to perform the update, and
    wherein the determining further determines whether or not the function type of the ECU set to receive an ID of the update message corresponds to any of the identified one or more function types,
    when the function type of the ECU set to receive the ID is determined to correspond to any of the identified one or more function types, the ECU (i) that is other than the master ECU, and (ii) that is set to receive the update message having the ID, executes the update according to the update message, and
    wherein the plurality of function types is prioritized according to a designated level of authority, the plurality of function types including chassis-related functions, body-related functions, safety/comfort functions, and telematics/infotainment functions.

2. The update management method according to claim 1, wherein the ECUs perform communication via the network following a Controller Area Network (CAN) protocol, and wherein the external tool transmits the update message following the CAN protocol.

3. The update management method according to claim 2, wherein the update authority information indicates one level out of a plurality of levels for identifying the one or more function types, where a higher level identifies a plurality of function types encompassing one or more function types that a lower level encompasses.

4. The update management method according to claim 1, wherein, when the update message has not been subjected to a predetermined encryption processing using the first session key, an ECU out of the ECUs other than the master ECU does update by the update message, and wherein the master ECU receives a public key certificate relating to a public key of the external tool, when the verification of the update authority information is successful, the master ECU encrypts a second session key used to subject the update message to the predetermined encryption processing at a time the external tool transmits the update message, using the public key of the external tool, and transmits the encrypted second session key to the external tool.

5. The update management method according to claim 1, wherein, the transferring of the update message to the network is not transferred by the master ECU when a state of a vehicle in which the onboard network system is installed is not a predetermined state.

6. The update management method according to claim 1, wherein the transferring of the update message to the network is not transferred by the master ECU when a battery that supplies electric power to the ECUs of the onboard network system does not have a predetermined remaining charge.

7. The update management method according to claim 1, further comprising:
transmitting, to the external tool, (i) identification information identifying the onboard network system out of multiple onboard network systems, and (ii) results information indicating processing results of the update message.

8. The update management method according to claim 7, further comprising:
transmitting the identification information and the results information to a server.

9. The update management method according to claim 1, wherein the update message updates firmware of the ECUs.

10. The update management method according to claim 1, wherein the external tool is connected to a server, and transmits to the server, results of update processing by the update message, identification information of the external tool, and vehicle identification information of the vehicle regarding that the update processing was performed, and
wherein the server saves the results of the update processing in a manner correlated with the identification information of the external tool and the vehicle identification information.

11. The update management method according to claim 1, wherein the alert message is transmitted to an ECU that controls a display, and
wherein the ECU that controls the display is caused to display the alert message on the display.

12. A master electronic control unit (master ECU) that is connected to a diagnostic port in an onboard network system, the onboard network system configured to connect to an external tool via the diagnostic port and having a plurality of electronic control units (ECUs) that performs communication via a network, the master ECU comprising:
a processor; and
a memory storing a computer program, the computer program, when executed by the processor, executes operations including
storing a shared key used in transmission of a first session key for an encryption processing between the master ECU and an electronic control unit (ECU) other than the master ECU, and an expiration date of the shared key,
receiving, from the external tool, update authority information indicating an authority of the external tool, and an update message instructing updating of the shared key,
verifying the update authority information,
when the update message is received, (i) when verification of the update authority information is successful and the update authority information indicates that a transmission of the update message is within the range of authority of the external tool, transferring the update message to the network, and (ii) when the verification of the update authority information fails, or the update authority information does not indicate that the transmission of the update message is within the range of authority of the external tool, not transferring the update message to the network,
acquiring external point-in-time information,
determining whether or not the external point-in-time information is before the expiration date, and
when the external point-in-time information is a predetermined amount of time before the expiration date or the expiration date has passed, transmitting an alert message prompting to update the shared key,
wherein the update authority information (i) identifies that one or more function types are out of a plurality of function types related to operation of a vehicle for classifying the ECUs, and (ii) indicates that the external tool has authority to cause the ECU that is classified to any of the identified one or more function types, to perform the update, and
wherein the determining further determines whether or not the function type of the ECU set to receive an ID of the update message corresponds to any of the identified one or more function types,
when the function type of the ECU set to receive the ID is determined to correspond to any of the identified one or more function types, the ECU (i) that is other than the master ECU, and (ii) that is set to receive the update message having the ID, executes the update according to the update message, and
wherein the plurality of function types is prioritized according to a designated level of authority, the plurality of function types including chassis-related functions, body-related functions, safety/comfort functions, and telematics/infotainment functions.

13. A non-transitory recording medium having a computer program stored thereon, the computer program causing a processor to execute operations comprising:
causing a master electronic control unit (master ECU) that is included in a plurality of electronic control units (ECUs) that perform communication via a network in an onboard network system to store a shared key used in transmission of a first session key for an encryption processing between the master ECU and an electronic control unit (ECU) other than the master ECU, and an expiration date of the shared key, when the master ECU receives an update message from an external tool instructing updating of the shared key, causing the master ECU to verify update authority information indicating authority of the external tool, and determine whether or not a transmission of the update message is within a range of authority of the external tool, (i) when verification of the update authority information is successful, and the transmission of the update message by the external tool is determined to be within the range of authority of the external tool, causing the master ECU to transfer the update message to the network, (ii) when the verification of the update authority information fails, or transmission of the update message by the external tool is determined to be outside of the range of authority of the external tool, causing the master ECU not to transfer the update message to the network, and causing the master ECU to acquire external point-in-time information, to determine whether or not the external point-in-time information is before the expiration date, and when the external point-in-time information is a predetermined amount of time before the expiration date or the expiration date has passed, and to transmit an alert message prompting to update the shared key, wherein the update authority information (i) identifies that one or more function types are out of a plurality of function types related to operation of a vehicle for classifying the ECUs, and (ii) indicates that the external tool has authority to cause the ECU that is classified to any of the identified one or more function types, to perform the update, and wherein the determining further determines whether or not the function type of the ECU set to receive an ID of the update message corresponds to any of the identified one or more function types, when the function type of the ECU set to receive the ID is determined to correspond to any of the identified one or more function types, the ECU (i) that is other than the master ECU, and (ii) that is set to receive the update message having the ID, executes the update according to the update message, and wherein the plurality of function types is prioritized according to a designated level of authority, the plurality of function types including chassis-related functions, body-related functions, safety/comfort functions, and telematics/infotainment functions.

* * * * *